United States Patent [19]

Usami et al.

[11] Patent Number: 5,404,426

[45] Date of Patent: Apr. 4, 1995

[54] METHOD OF DISPLAYING HAIR STYLE AND APPARATUS FOR THE SAME

[75] Inventors: Yoshiaki Usami, Hitachi; Kenichi Anjyo, Tokyo; Ryozo Takeuchi, Hitachi, all of Japan

[73] Assignee: Hitachi, Ltd., Tokyo, Japan

[21] Appl. No.: 886,165

[22] Filed: May 21, 1992

[30] Foreign Application Priority Data

May 21, 1991 [JP] Japan .................................. 3-116209
Aug. 30, 1991 [JP] Japan .................................. 3-220443

[51] Int. Cl.⁶ .............................................. G06F 15/66
[52] U.S. Cl. ........................................ 395/120; 395/135; 395/141
[58] Field of Search ............... 395/152, 161, 135, 119, 395/120, 141, 142

[56] References Cited

U.S. PATENT DOCUMENTS

| | | | |
|---|---|---|---|
| 4,434,467 | 2/1984 | Scott | 395/135 X |
| 4,731,743 | 3/1988 | Blancato | 395/135 |
| 5,113,493 | 5/1992 | Crosby | 395/152 |
| 5,163,006 | 11/1992 | Deziel | 395/135 X |
| 5,189,626 | 2/1993 | Colburn | 395/161 X |
| 5,239,624 | 8/1993 | Cook et al. | 395/152 X |
| 5,265,197 | 11/1993 | Kondo | 395/161 X |

FOREIGN PATENT DOCUMENTS

| | | |
|---|---|---|
| 293775 | 9/1988 | Japan . |
| 2127774 | 11/1988 | Japan . |
| 2170288 | 12/1988 | Japan . |

OTHER PUBLICATIONS

Rosenblum et al., "Simulating the Structure and Dynamics of Human Hair: Modelling, Rendering and Animation", Jol. of Visualization and Computer Animation, vol. 2:141–148 (1991).

LeBlanc et al., "Rendering Hair using Pixel Blending and Shadow Buffers", John Wiley and Sons, Ltd., 1991, pp. 96–110 (to be published in the Journal of Visuali-ation and Computer Animation, vol. 2, No. 3.

"Display of hair movement by probability model", Technical Report of Electronic Information Communication Society, vol. 89, IE 89–60.

Primary Examiner—Heather R. Herndon
Assistant Examiner—Cliff N. Vo
Attorney, Agent, or Firm—Antonelli, Terry, Stout & Kraus

[57] ABSTRACT

Hair models of human or, animal hairs are displayed on a display screen using a three-dimensional computer graphics technique. Each human hair model is constructed of a plurality of rod-shaped hair elements. The magnitude and direction of an external force applied to each hair element are designated. A deformation quantity of each hair element is obtained such that the external force having the designated magnitude and direction equilibrates with an internal force generated by the rigidity of each hair element. The shape of each hair model is determined in accordance with obtained deformation quantities, for display of the shape of each hair model. The hair model can be displayed man-machine interactively.

20 Claims, 18 Drawing Sheets

METHOD OF DISPLAYING HAIR STYLE AND APPARATUS FOR THE SAME

BACKGROUND OF THE INVENTION

The present invention relates to a method and apparatus for displaying a hair style, and more particularly to a method of modeling human head hairs and animal hairs and a computer graphics technique for realistically displaying images of hairs on a display.

In a hair modeling method, such as described in JP-A-2-93775, the shape of hairs is expressed by using a number of polygons, and the detailed textures and attributes of hairs are mapped on the polygons by considering anisotropic reflections of hairs, to thereby obtain an image of hairs.

In another example as described in JP-A-2-127774 and JP-A-2-170288, each hair is modeled, for example, and expressed by a triangular prism instead of a shape of a hair element, then by adjusting positions and directions of the triangular prisms, so an image of hairs can be obtained.

As to a technique of expressing a motion of human hairs through computer animation, it has given by "Movement of Hair by Stochastic Model", The Institute of Electronics, Information and Communication Engineers of Japan, Study Report Vol.89, IE89-60. According to this method, using an experimental rule obtained by actually measuring how a curve changes under a uniform wind force, a motion of all hairs is reproduced under the uniform wind force.

With the above-described examples, it is necessary for a user to finely determine parameters defining the shape of hairs or hair style, imposing a difficult work of trial and error, upon ordinary users.

A motion of hairs in an external force can be calculated in principle by solving a mechanics equation applied to each hair which is assumed to be an elastic body. In this case, such a mechanics equation is the following Euler-Lagrange equation:

$$\partial(\rho\partial r/\partial t)/\partial t + r\partial r/\partial t + \delta E(r)\delta/r = f(r, t) \qquad (1)$$

where $r=r(a, t)$ is a function of a one-dimensional parameter a and time parameter t, and represents a curve. The $\rho=\rho(a)$ and $r=r(a)$ of the equation (1) at the left side represent the density of curves and an attenuation coefficient at point a. $E(r)$ represents a potential energy, and $\delta E(r)/\delta r$ represents its first variation. $f=f(r, t)$ at the right side represents an external force term. The equation (1) is used for a single curve. In order to deal with n hairs, the equations for $r=r_1, r_2, \ldots, r_n$ are required to be simultaneously solved. In such a case, the external force term f at the right side takes a value dependent upon $r_1, r_2, \ldots, r_n$ because of interaction between hairs. Since the value n usually takes several tens to hundreds thousands, it is almost impossible to simultaneously solve such a great number of equations when considering the processing capability of a general graphics workstation. From this reason, the above-described technique provides a representation of a simplified motion under a considerably limited condition.

The above-described technique, however, is not easy to enter parameters necessary for a desired motion, and cannot provide a representation of various types of motions. Furthermore, the above-described technique uses a simplified model, and so only a steady state of motion under a uniform wind force is obtained. On the other hand, solving precisely so many mechanics equations is not practical as described above.

SUMMARY OF THE INVENTION

It is an object of the present invention to provide a method and apparatus for displaying a hair style capable of displaying a very natural state of motion of human head hairs and animal hairs caused by an external force and hair material nature, by entering simple parameters.

According to one aspect of the embodiment of the present invention, there is provided a method of displaying a hair style. In displaying human and animal hairs by modeling a hair in a particular shape and by using a three-dimensional computer graphics technique, each hair model is formed by a number of rod-shaped hair elements, the magnitude and direction of an external force applied to the hair model are given, a deformation quantity of the hair model is obtained such that the external force is equilibrated with the internal force generated by the rigidity of the hair elements, and the shape of each hair model is determined by the deformation quantity.

A hair modeling apparatus of the present invention displays human and animal hairs by modeling a hair in a particular shape and by using a three-dimensional computer graphics technique. The apparatus includes a display, an input unit for entering the magnitude and direction of an external force applied to a rod-shaped hair element and the flexural rigidity of the hair element, a calculation unit for calculating a deformation quantity of each hair element extending from the surface of a human head or animal body, in accordance with the flexural rigidity and external force, and a display control unit for displaying each hair element as well as a base body representing the human head or animal body on the display in accordance with the deformation quantity calculated by the calculation unit.

In the manner described above, a physical environment of actual hairs is simulated, and a state of flexural deformation of hairs caused by an external force is calculated, to thereby determine the hair style.

Specifically, a user designates, for exampled a flexural rigidity of a hair and an external force vector applied to the hair. Simply designating these parameters, the flexural rigidity of each hair and the hair style can be determined from their physical relationship. It is accordingly unnecessary to finely designate the position and direction of each hair, allowing ordinary users to easily designate the hair style.

According to a second aspect of the embodiment of the present invention, there is provided an interactive computer animation processing method of displaying hairs deformed by an external force. The method of displaying a hair style includes the steps of (a) assumingly defining each hair as an elastic body, (b) determining the initial shape of the elastic body, (c) giving an external force applied to the elastic body and the attribute of the elastic body, (d) solving a mechanics equation representing elastic body deformation and obtaining a time sequential change in position of the elastic body from the initial shape, (e) previewing an animation obtained from the time sequential change, (f) repeating the steps (c) to (e) until a desired result is obtained and generating an elastic body curve, and (g) interpolating the motions of obtained elastic body curves to generate the motions of other elastic bodies.

An interactive computer animation processing apparatus for displaying hairs deformed by an external force, includes a display, an input unit for entering the initial shape of a hair assumingly defined as an elastic body, an external force including a gravity and wind force applied to the elastic body, and an attribute including the material of a hair assumingly defined as an elastic body, a calculation unit for calculating a change in position of elastic body curves of specific elastic bodies caused by the external force, and an interpolation unit for interpolating the motions of obtained elastic body curves to generate the motions of other elastic bodies.

With the apparatus described above, if a hair is assumed as an elastic body, basically a collective motion of hair curves (corresponding to elastic body curves) can be obtained through simulation by using the above equation (1). As described previously, the external force term of the equation (1) becomes complicated if interaction between hairs is taken into consideration, and a load of calculation becomes enormous. In view of this, (A) a user defines the external force term and the attribute of a hair in an artificial manner, (B) only about several tens to several hundreds specific hairs are subject to calculation, and (C) an animation of the calculation results is previewed. The processes (A) to (C) are repeated until a desired result is obtained, and thereafter all hairs are subject to calculation. In this case, a calculation is carried out by using an algorithm for interpolating the motions of the specific hair curves obtained by the processes (A) to (C) to obtain the motions of other hair curves without using again the mechanics equation. Namely, the incorporation is the input unit for entering an artificially defined external term of the equation (1) and hair attribute, a preview function for previewing the motions of the specific hair curves, and a high speed hair motion interpolation algorithm.

A provision of the input unit for entering the artificially defined external force term of the equation (1) and hair attribute allows a simple expression of the external force term of the equation (1). Accordingly, simultaneous calculation of a number of mechanics equations described previously can be dispensed with. Furthermore, a provision of a preview function for previewing specific hair curves of about several hundreds at the most allows a reduced number of trials and errors for obtaining a desired motion. Still further, the calculation of all hairs can be speeded up by introducing the interpolation algorithm using the calculation results of the specific hair curves, enabling to obtain easily and at a high speed an animation representing a desired motion.

DESCRIPTION OF THE PREFERRED EMBODIMENTS

Figure 1A:
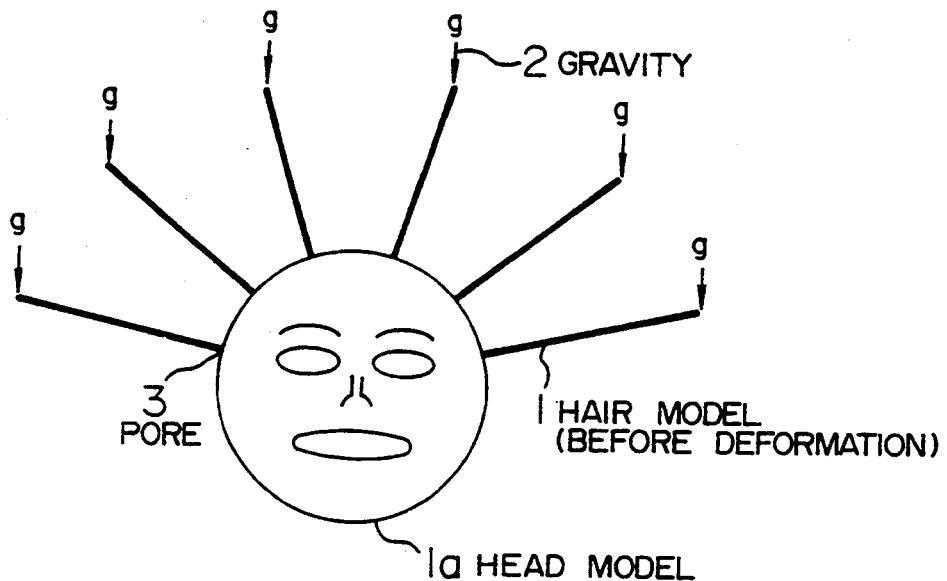
FIGS. 1A and 1B illustrate a hair model used by a hair modeling method according to a first embodiment of the present invention.
Figure 1B:
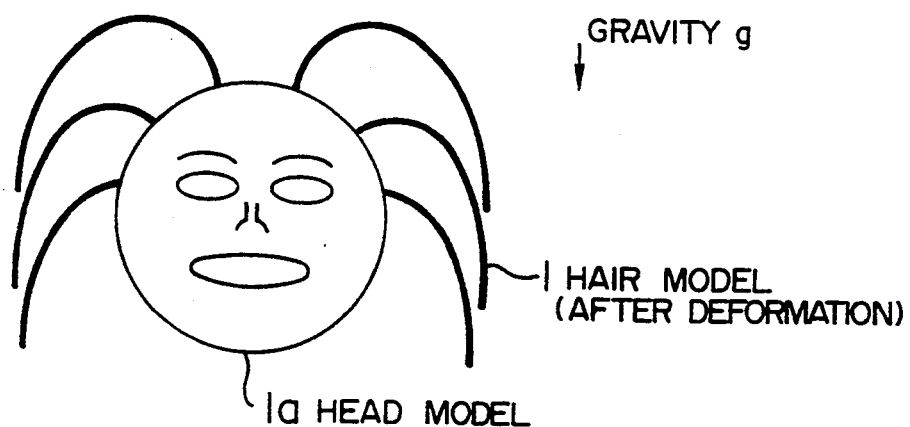

Embodiments of the present invention will be described with reference to the accompanying drawings. FIGS. 1A and 1B illustrate the outline of a head model $1a$ of the present invention. The head model $1a$ includes a hair model 1 growing on a pore 3 of a human head skin. Under a gravity-free state, each hair model 1 radially extends from the center of the head model $1a$. This state is called an initial state of a hair style before deformation. Under an actual gravity g, each hair model 1 receives a downward force and deforms as shown in FIG. 1B. According to the present invention, this deformation quantity is calculated to determine a hair style.

Figure 2A:
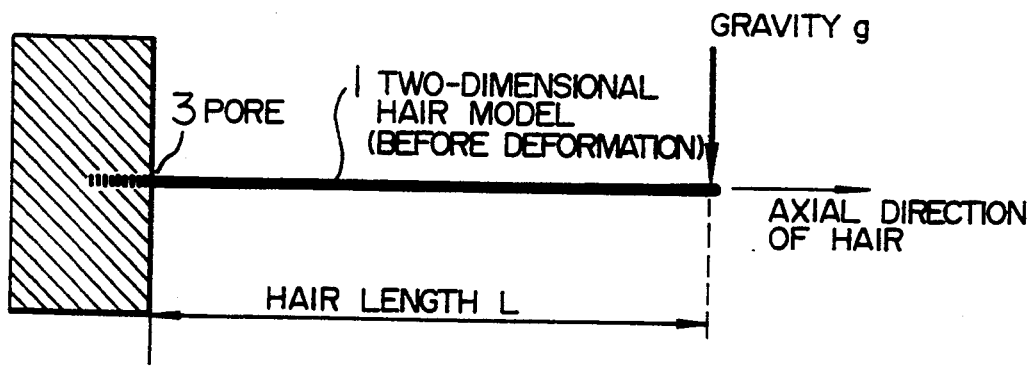
FIGS. 2A, 2B and 2C illustrate a definition of a two-dimensional hair model.
Figure 2B:
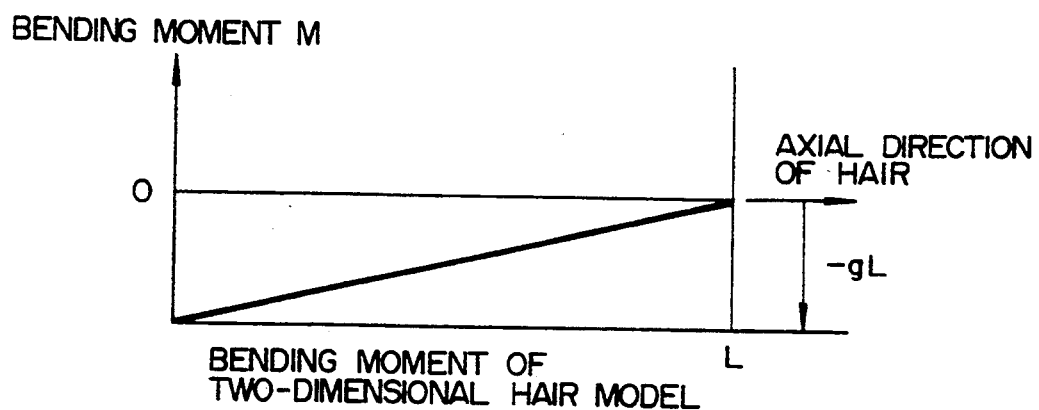
Figure 2C:
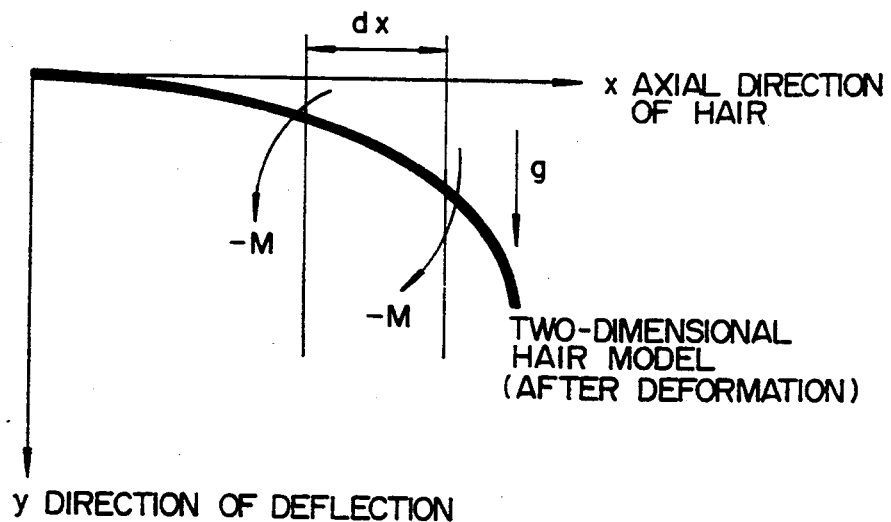

In order to calculate a deformation quantity, the hair model 1 under an actual physical environment is modeled in the manner illustrated in FIGS. 2A, 2B and 2C showing a definition of a two-dimensional hair model which will be later expanded to a three-dimensional hair model. Each of the hair model 1 is assumed to be a rod element having the same cross sectional area. One end point of this hair element is assumed to be fixed to the pore 3. The axial direction of the hair model 1 is the direction thereof extending from the pore 3. Each of the hair models 1 is assumed to have a length L. It is assumed that a gravity g is concentrically applied to the other end point of the hair model 1 not fixed. This hair model 1 is equivalent to a cantilever model of material strengths. Upon application of such a gravity, the hair model 1 deforms by a bending moment and shearing force. The deformation quantity by a bending moment is greater than, and predominant over, that by a shearing force, so the deformation by a shearing force will be neglected in the following description. The bending moment M of the two-dimensional hair model is 0 at the end point not fixed as shown in FIG. 2A, and $-gL$ at the fixed end point on the pore side as shown in FIG. 2B. The following deflection equation will be obtained from material strengths, on condition that the hair element undergoes elastic deformation as shown in FIG. 2C:

$$d(dy/dx)/dx = -(M/(E*I)) \tag{2}$$

where "E" represents a Young's modulus determined by resistance to deformation of material of the element. "I" represents a second moment of area determined by the cross section of the element. "E * I" is usually called a flexural rigidity which is a constant expressing resistance to bending of the element. "−M" is a moment caused by a force externally applied to the element. "d(dy/dx)/dx * (E*I)" is a moment by an internal force exerted by the flexural rigidity of the element. The equation (2) therefore indicates an equilibrium state between the external and internal forces of each hair. Using this equation, it is possible to calculate a deformation quantity of each of the hairs 1 caused by a gravity.

Figure 3:
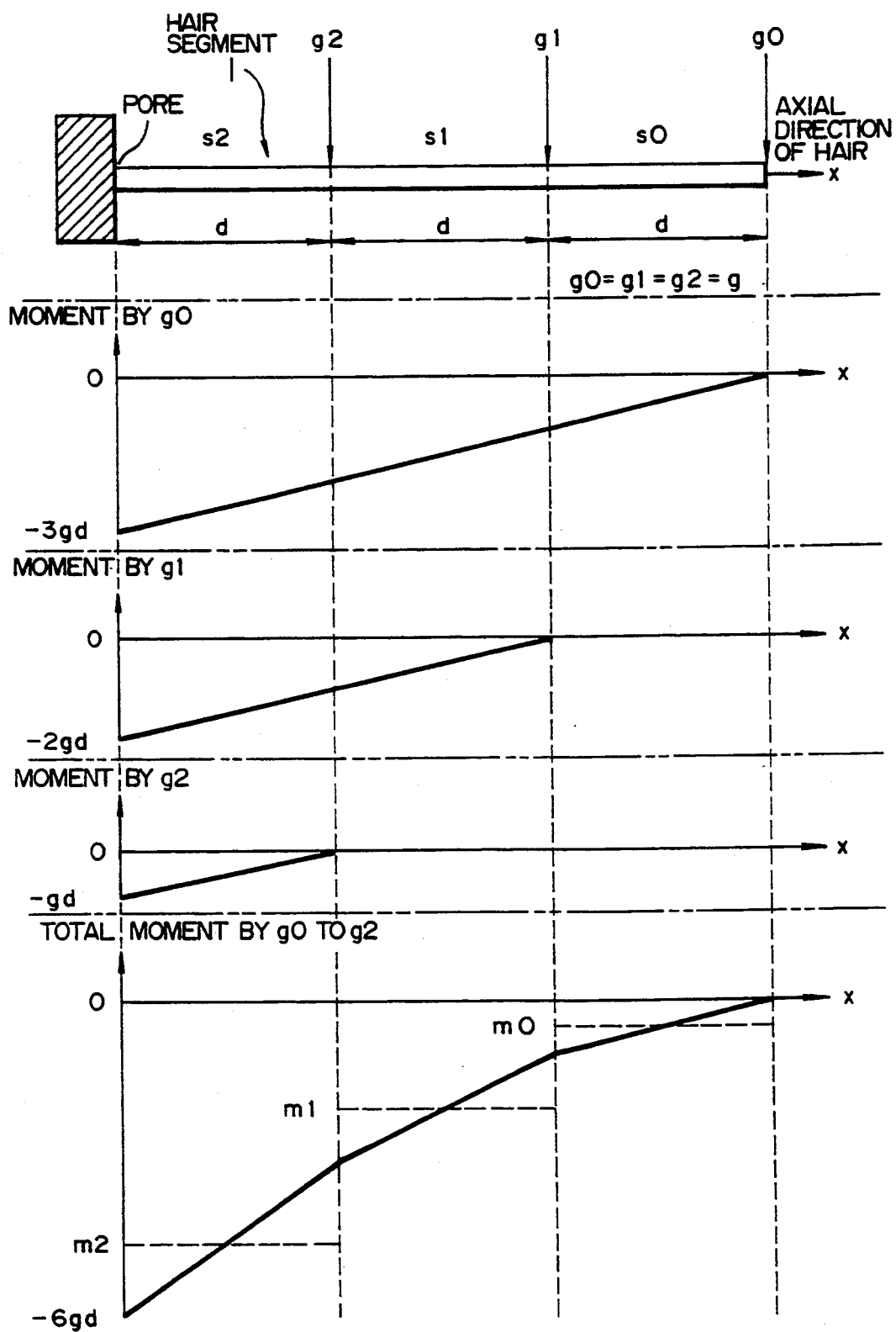
FIG. 3 illustrates calculation of a bending moment.

A method of calculating a bending moment will be described with reference to FIG. 3. Each of the hair model 1 shown in FIGS. 2A, 2B and 2C is assumed, for the purpose of calculation, to be Composed of a plurality of straight hair segments each having the same length d, as shown in FIG. 3. In the example shown in FIG. 3, the hair model 1 is composed of three consecutive hair segments s0, s1 and s2. Gravities are assumed to be concentrically applied to ends of the segments on the remote side from the fixed end point of the hair model 1, which are represented by g0, g1 and g2 having the same magnitude and direction. In obtaining moments generated at these segments, moments for g0, g1 and g2 are first independently calculated, and then these moments are added together to obtain a total moment. The total moment for g0 to g2 is given by a solid line at the lowermost position of the graph of FIG. 3. In order to simplify calculation, they are assumed to take constant values (average values) m0, m1 and m2 indicated by broken lines. From the deflection equation (2), the deflection quantity at a point k' spaced apart from a point (k−1) by a distance d can be obtained by the following equation:

$$y = (-\tfrac{1}{2})*(M/(E*I))*d*d \tag{3}$$

Figure 14:
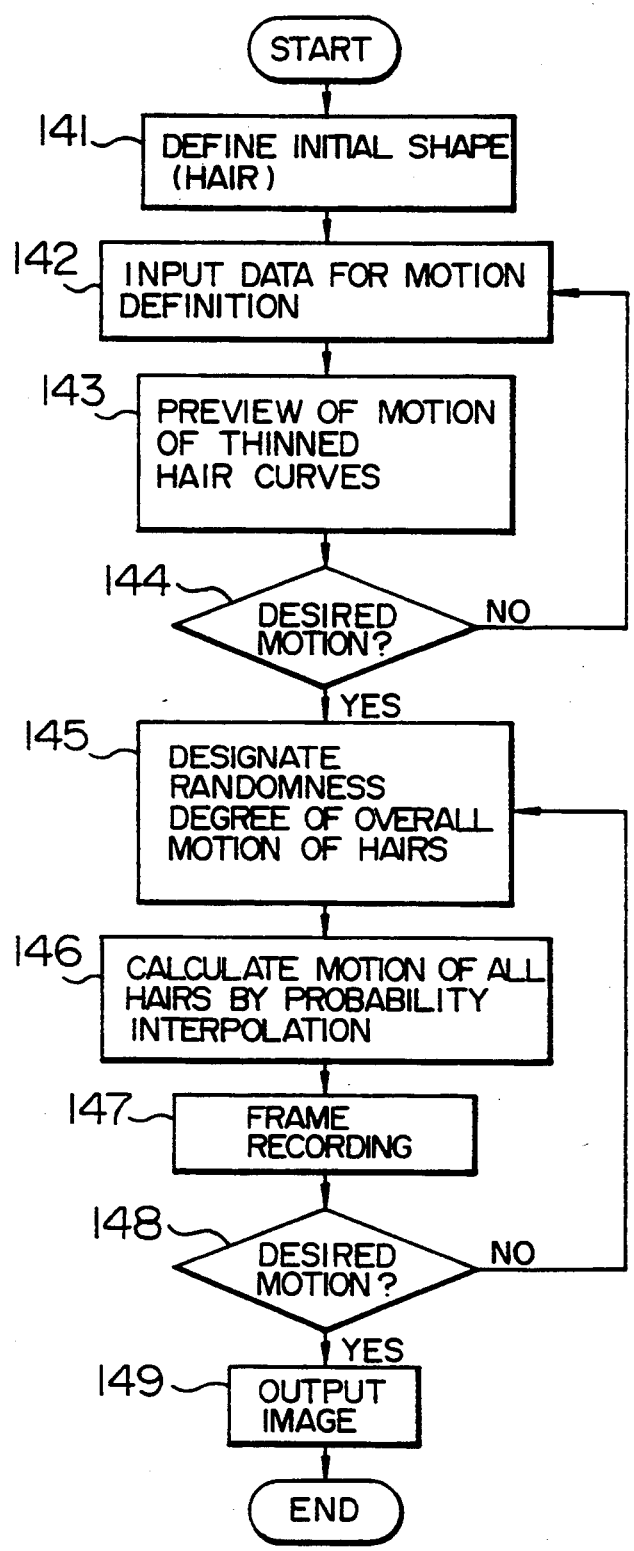
FIG. 14 is a flow chart showing the fundamental procedure of calculating a hair model motion according to the second embodiment of the present invention.

The sequence of calculating the deflection quantity is illustrated in FIG. 14 using a two-dimensional hair model. In this example, the hair model 1 is assumed to have two hair segments s1 said s0 with end points k−2, k−1 and k. The position of each end point is determined by sequentially adding deflection quantities of hair segments starting from the first hair segment whose end point is fixed. It is assumed that the positions of end points k−2 and k−1 have already been determined. Therefore, calculation is made for the position of the end point k. Fixed spatial coordinate axes are represented by x0 and y0. The X axis in the axial direction of a hair and Y axis in the deflection direction change with the orientation of a hair segment, so that the X and Y axes constitute a local coordinate system and not a spatially fixed coordinate system. First, the direction of the X axis which is the axial direction of the hair model 1 Is determined basing upon the known orientation of s1, to obtain the coordinate values of the end point k' before deformation. Next, the direction perpendicular to the X axis is determined as the Y axis. The gravity g is separated into components gx and gy parallel with the X and Y axes. Since gx generates no moment for s0, it is neglected and only gy is considered. The deflection quantity y is obtained from the equation (3). A point moved from the point k' in the Y axis direction by y is represented by e. A line coupling points e and k−1 is represented by a vector T. There is obtained a point spaced apart from point k−1 in the direction of T by d. In this manner, the position of the point k is obtained.

Figure 4:
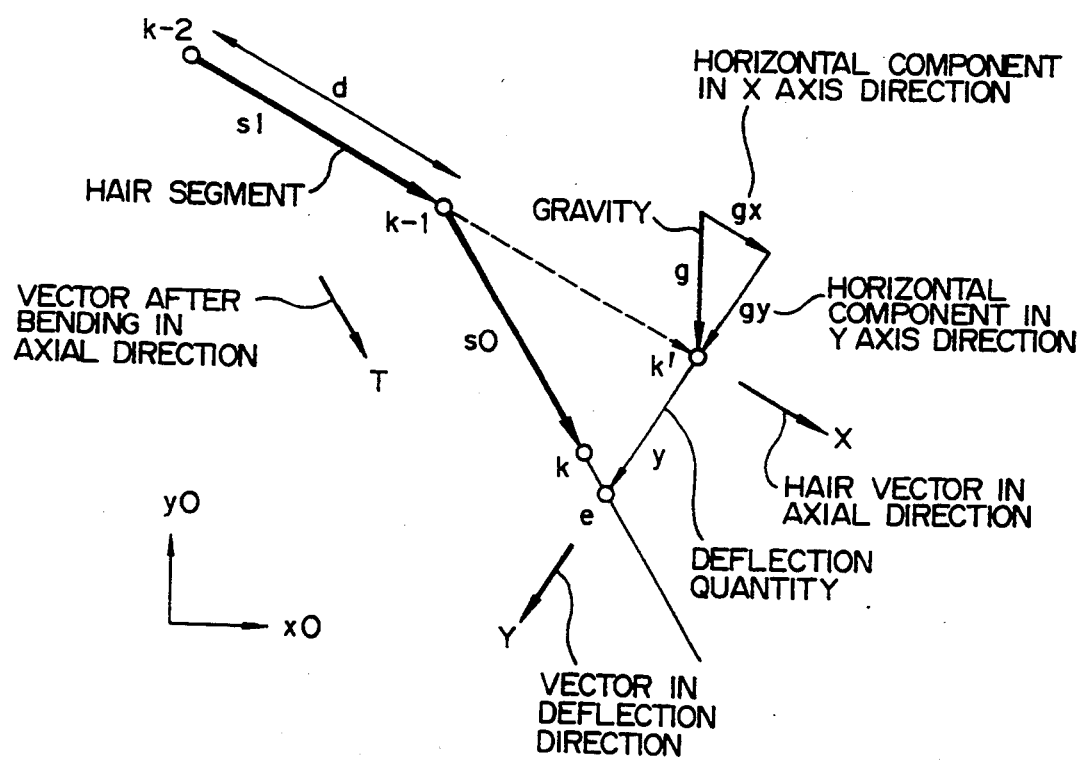
FIG. 4 illustrates deflection of a two-dimensional hair model.
Figure 5:
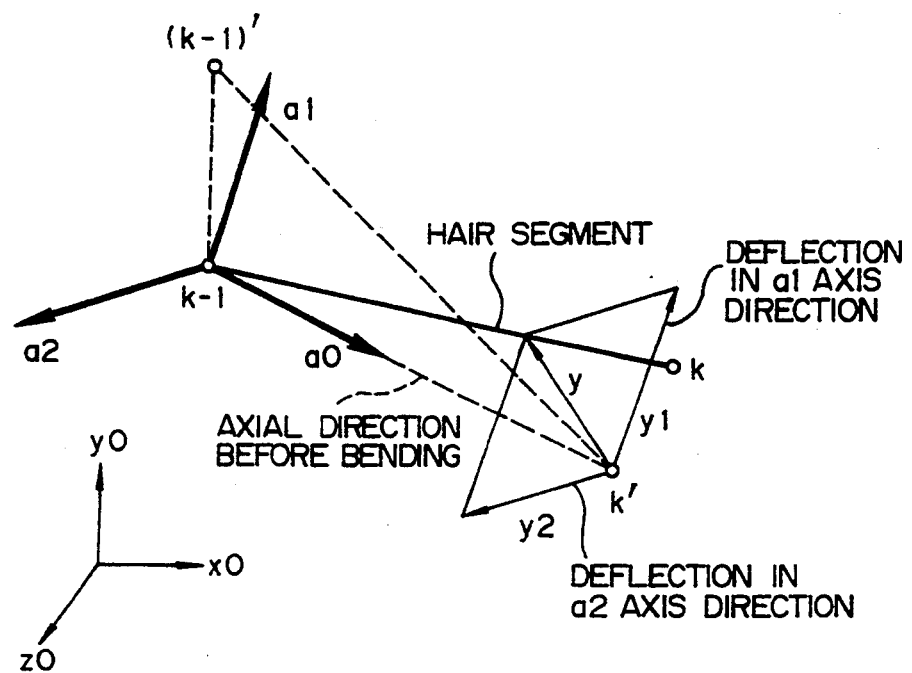
FIG. 5 illustrates deflection of a three-dimensional hair model.

FIG. 5 illustrates a method of calculating a deflection quantity of the hair model 1, extended from the method illustrated in FIG. 4 to a three-dimensional hair model. In the three-dimensional hair model, the axial direction before deformation is determined as an a0 axis interconnecting points k−1 and k'. Next, the point k−1 is shifted in the y0 axis by a constant distance to obtain a point (k−1)'. A plane is obtained which is defined by three points k−1, (k−1)' and k. The direction perpendicular to the a0 axis one this plane is represented by an a1 axis. The direction perpendicular to both a0 and a1 axes is represented by an a2 axis. A gravity is separated into gravity components in these three axes directions. Similar to the two-dimensional model, no moment is generated in the a0 axis direction. The deflection quantity y1 in the a1 axis direction and the deflection quantity y2 in the a2 axis direction are independently calculated using the equation (3), and added together to obtain a final deflection quantity y for the three-dimensional model. Thereafter, similar to the two-dimensional model, the position of the end point k of the hair segment is obtained.

Figure 6:
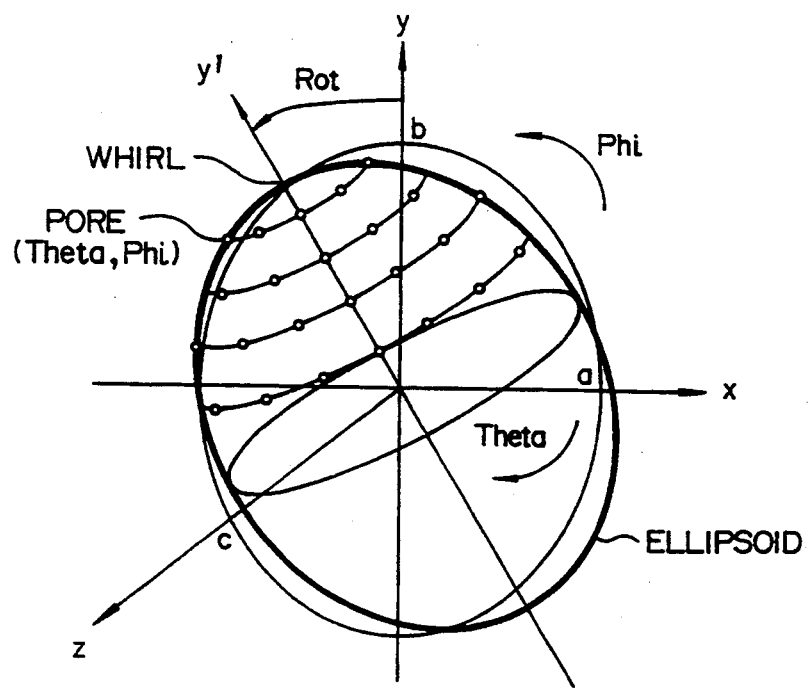
FIG. 6 illustrates positions of pores.

How hairs are positioned on pores will be described with reference to FIG. 6. In this embodiment, the pores from which the hairs grow are assumed that all pores are on the surface of a predetermined ellipsoid. The size of this ellipsoid is defined by values a, b and c in x, y and z axes. The ellipsoid is used by rotating it about the z axis by an angle Rot. The size of the ellipsoid is set sufficient for containing the head model therein. However, since a space between the pores and the head is displayed, an additional hair segment is used for each of the hair models 1 Which extends from each of the pores 3 toward the center of the ellipsoid. With this arrangement, the root portion of each of the hair models 1 is embedded in the head model 1a. The hair model 1 embedded in the head model 1a is covered by the head model 1a in front of the hair model 1, by using a Z buffer algorithm to be described later or the like. The front direction of a face of the head model 1a is a positive x direction, and an cross point between the rotated y' axis and the ellipsoid represents the whirl of hairs. The position of a pore is represented by the ellipsoidal coordinate system. The directions of angles phi and theta are defined as shown in FIG. 6. The area of the pores 3 and hair models 1 on the pores 3 is identified by the values of phi and theta. The angle phi is an elevation angle relative to the x-z plane, and the angle theta is an azimuth angle on the x-z plane from the x axis. The positions of the pores 3 are determined by obtaining the circumferential lengths in the phi and theta directions from an inputted distance value, and by selecting the distance value same for both the directions.

Figure 7:
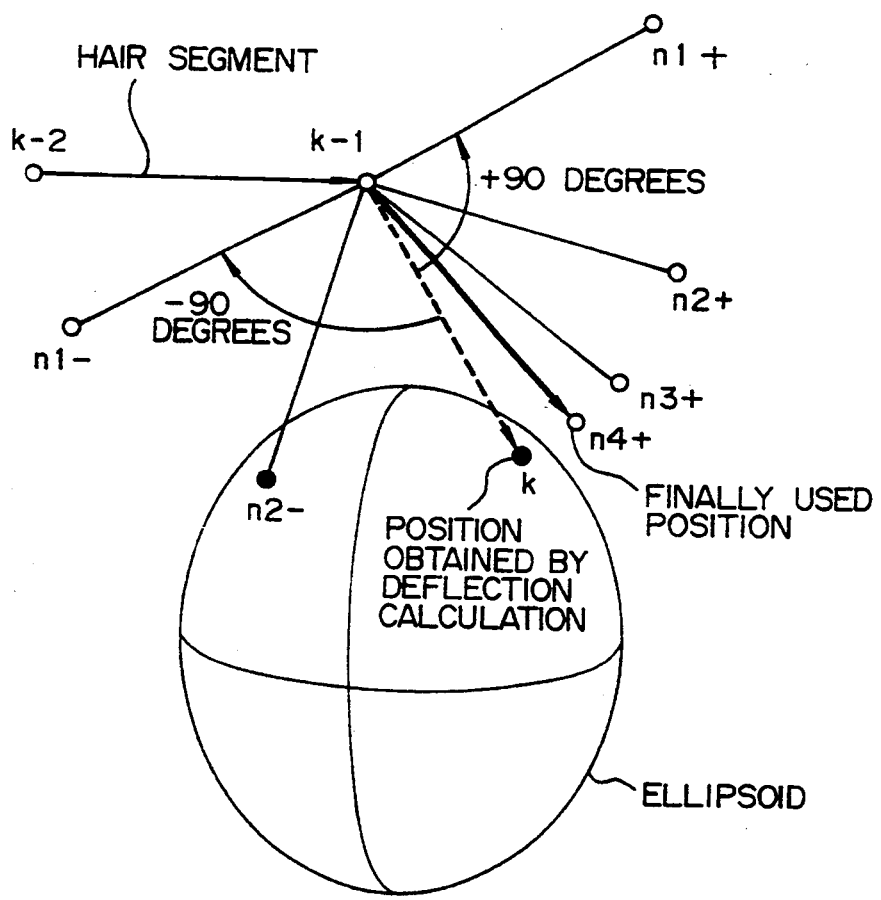
FIG. 7 illustrates collision avoidance.

The method of calculating a deflection quantity of a hair caused by a gravity has been described above, The deflection quantity calculation only by a gravity may result in the unrealistic case that hairs enter within the head model 1a depending upon the direction of a gravity. The head model 1a is usually constructed of a great number of polygons, so that interference between the head model 1a and hair models 1 is difficult to be checked for all polygons. For this reason, in this embodiment, not interference between the head model 1a and hair models 1, but interference between an ellipsoid and hairs is checked to avoid Such interference. This method will be described with reference to FIG. 7. Like the case shown in FIG. 4, a point k is assumed to be the position obtained through deflection calculation. Whether this point k is within the ellipsoid or not can be easily determined by checking the coordinate values of the point from the ellipsoid equation. If this point is within the ellipsoid, the hair collides with the ellipsoid, requiring a process of avoiding such collision. In FIG. 7, a black solid circle indicates a point within the ellipsoid, and a white empty circle indicates a point outside the ellipsoid. If there is a collision, avoiding the collision is performed first in the $+-90$ degrees from the point k on the plane defined by three points $k-2$, $k-1$ and k. A new point obtained through collision avoidance in the $+90$ degree direction is represented by $n1+$, and another new point obtained through collision avoidance in the $-90$ degree direction is represented by $n1-$. At this time, collision with the ellipsoid is again checked. In this case, there is no collision as shown in FIG. 7. Then, the angle of collision avoidance in both the directions is halved to again check whether there is any collision. The points obtained in this case are represented by $n2+$ in the $+45$ degree direction and by $n2-$ in the $-45$ degree direction. In the example shown in FIG. 7, the point $n2-$ collides with the ellipsoid. Collision avoidance in the minus angle direction is not further performed, but collision avoidance only in the plus angle is performed by halving the angle. The obtained point is represented by $n3+$. This point does not collide with the ellipsoid so that another point $n4+$ is obtained. The number of avoidance calculations is set in advance. In this example, the number is "4" so that the avoidance process is terminated at this time. Accordingly, the point $n4+$ is the position finally used as the end point of the hair segment.

Figure 8:
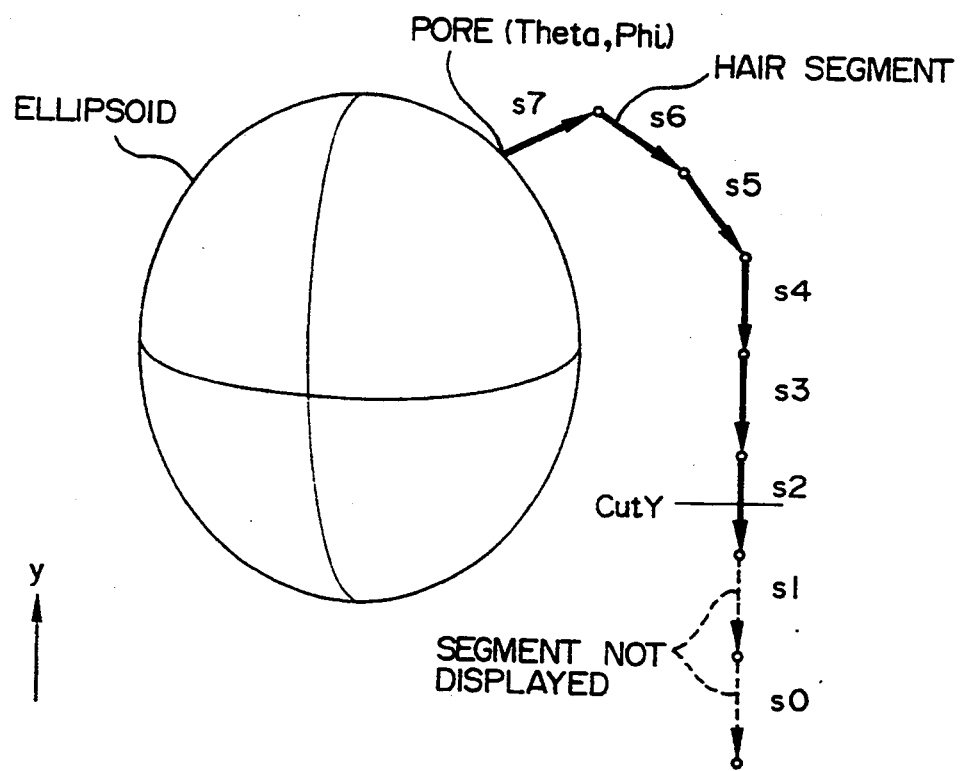
FIG. 8 illustrates designating hair cutting.

In order to set the hair style, the hair is required to be trimmed and cut. This method is shown in FIG. 8. Assuming that the number of hair segments is "8", hairs growing from pores within an area defined by angles theta and phi have eight segments s0 to s7. The position of cutting a hair is indicated by a height value CutY in the y-axis (i.e., position in the height direction). When this value is set, segments lower than the position of the value CutY are given a non-display attribute. As a result, although the segments s7 to s2 are displayed, the other segments are not displayed. It is possible to cut hairs by designating the area of pores (on which hairs are to be cut) by angles theta and phi and by designating the cut amounts CutY. In some case, the cut position may be designated not by the height value but by the length of a hair to be cut.

Figure 9:
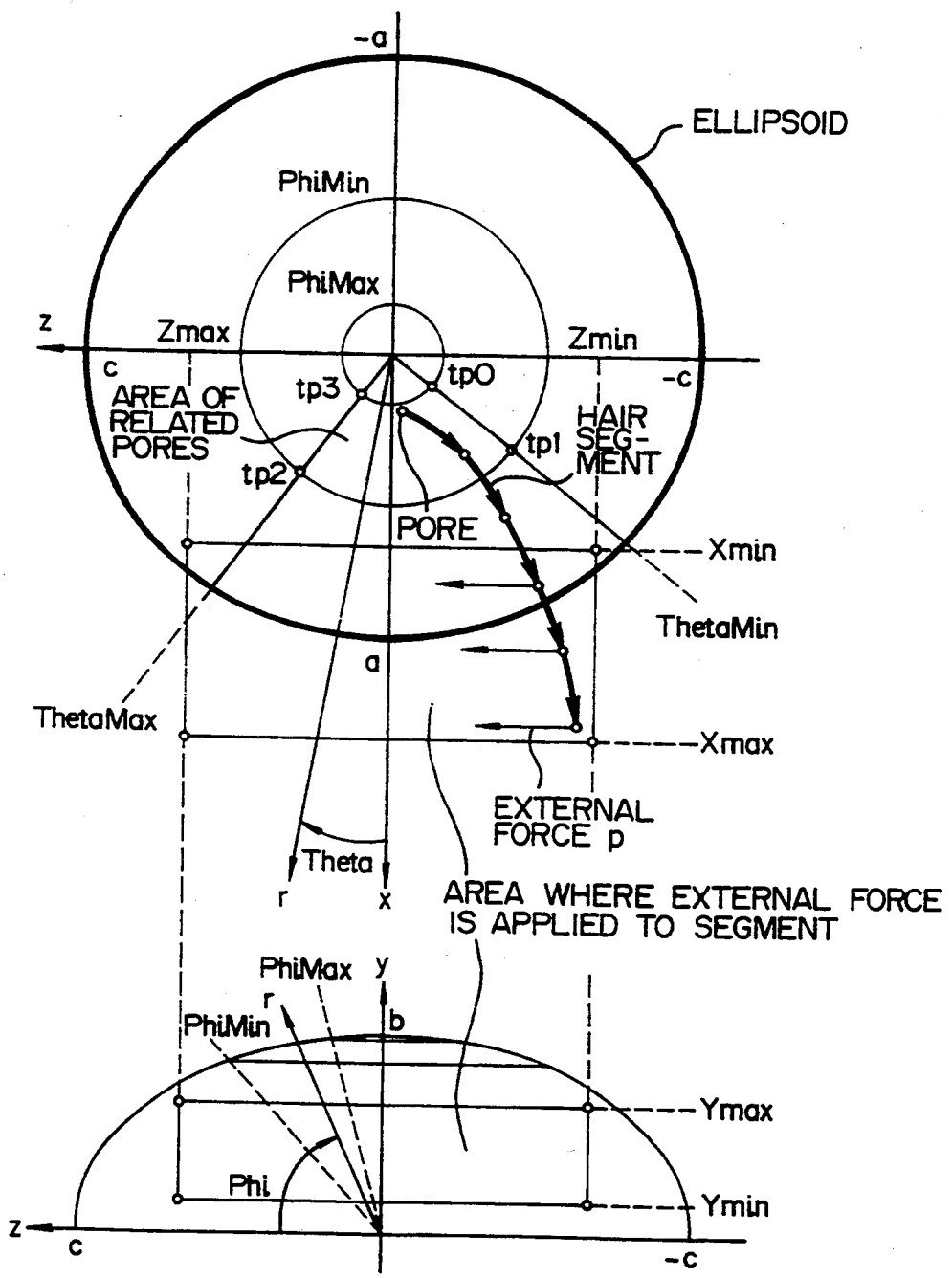
FIG. 9 illustrates designating an external force.

The hair style of person is not only deformed by a gravity but also changed intentionally using a comb or brush. Such an intentional hair style changing method and a change designating method will be described with reference to FIG. 9. For an intentional hair change, a gravity as well as an external force p is designated to calculate a bending deformation amount by using a sum of a gravity vector and an external force vector. The area of subject pores is designated by angles theta and phi, including maximum angles ThetaMax and PhiMax and minimum phi angles ThetaMin and PhiMin. This area is shown in FIG. 9 as an area surrounded by four points tp0 to tp3. Specific hair segments growing from pores within this area are applied with an external force. The range of segments to which an external force is applied is designated by values on the x, y and z axes including maximum values Xmax, Ymax and Zmax and minimum values Xmin, Ymin and Zmin. Segments within this range are applied with an optional external force in desired ones of the x, y and z axis directions and radial direction r, to thereby change the hair style. In this embodiment, it is judged there is a segment within the designated range, if both end points of the segment are within the range.

Figure 10A:
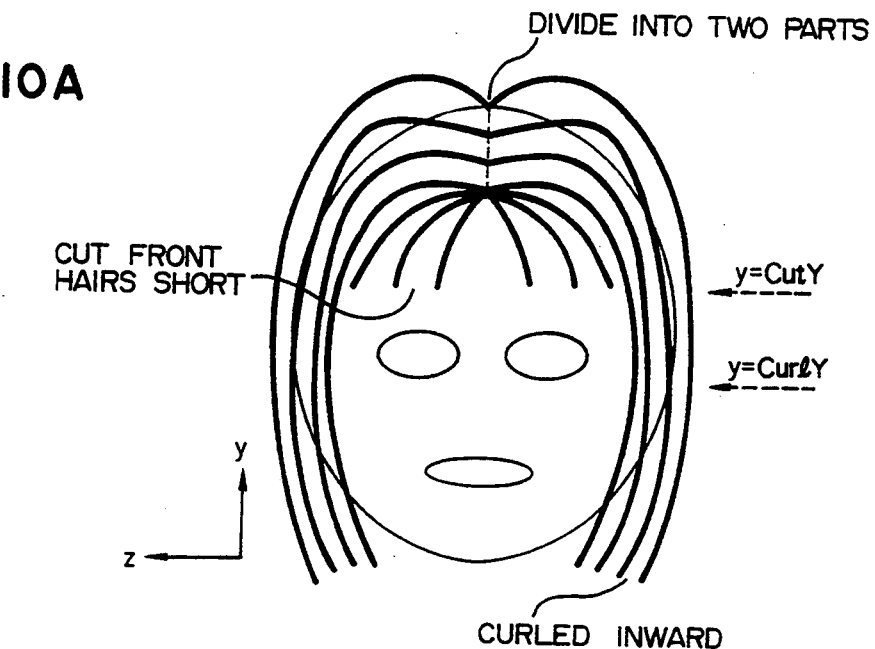
FIGS. 10A, 10B, 10C illustrate an example of designated external force and hair cutting.
Figure 10B:
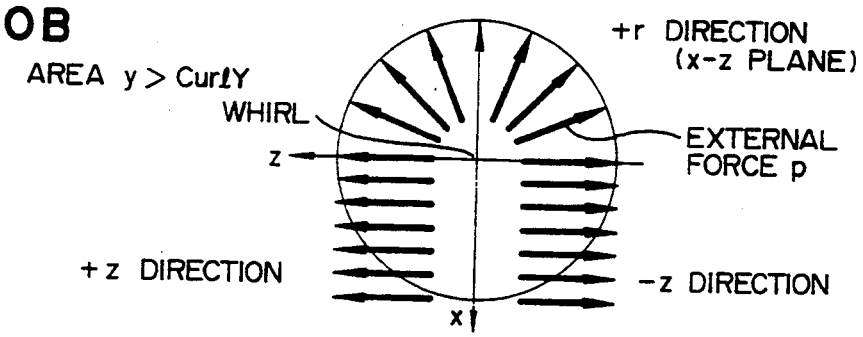
Figure 10C:
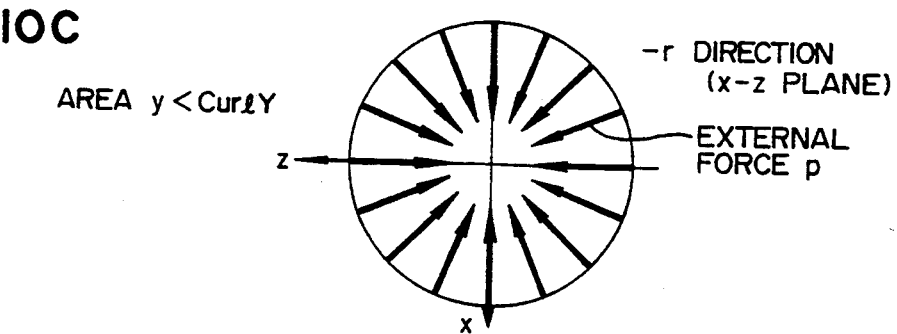

Referring to FIGS. 10A, 10B and 10C, an example of designating an external force and a cut position will be described. Consider a hair style shown in FIG. 10A wherein the hair is divided at the center of the head, front hairs are cut short, and lower side hairs are curled inside. The cut amount is determined by setting a value CutY as shown in FIG. 10A by designating angles theta and phi of front hairs. Different values of an external force are set between segments higher than Curly and those lower than y, on condition that segments lower than CurtY are curled inside. In order to divide the hair at the center of the head within an area y>CurlY, an external force is applied to an area from the front of the head to the whirl, and another external force is applied to the back of the head in the $+r$ radial direction on the x-z plane. By designating the magnitude and direction of an external force in the manner described above, various hair styles can be set.

Figure 11:
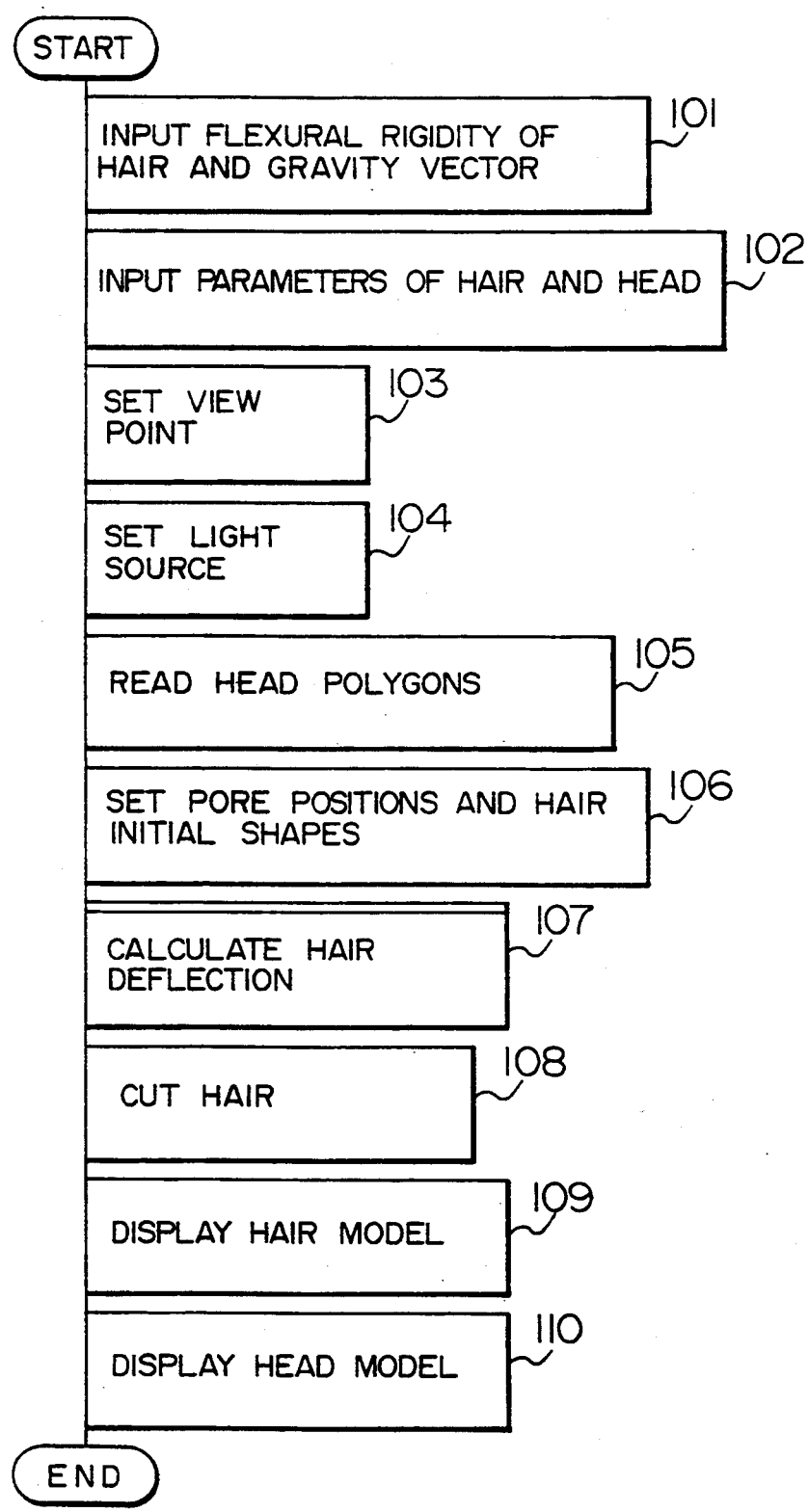
FIG. 11 is a flow chart showing the overall procedure of a hair modeling method according to the present invention.
Figure 12:
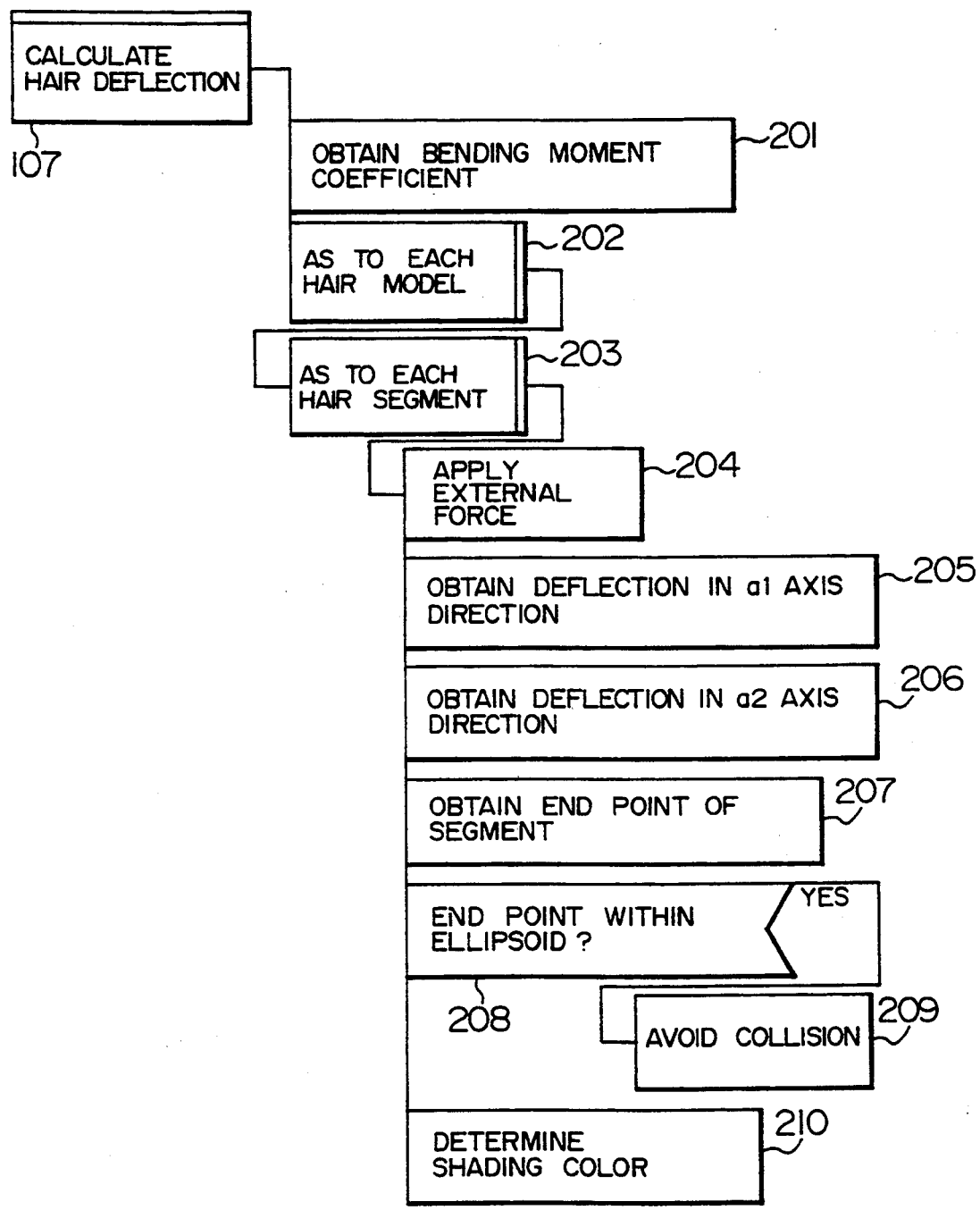
FIG. 12 is a flow chart showing the details of some processes of the flow chart shown in FIG. 11.

The overall procedure will be described with reference to the flow chart shown in FIG. 11. First at step 101, a flexural rigidity EI of hair and a gravity vector g (direction and magnitude) are entered. Inputted at the next step 102 are various parameters regarding the hair and head, such as the color of hair and the size of an ellipsoid. At step 103, the position of a view point, the size of a screen and the like are set. At step 104, the color, direction and the like of a light source are set. At step 105, polygon data of the head model 1a is read. At step 106, pores are disposed as shown in FIG. 6 and the initial shape of the hair model 1 is set as shown in FIG. 1. At step 107, the deflection of hairs is calculated, the details of this calculation being shown in and described with FIG. 12. At step 201 shown in FIG. 12, a deflection moment factor at each segment (i.e., ratio of moments of respective segments) is obtained as shown in FIG. 3. Steps 202 and 203 mean that the following steps are repeated for each segment of a hair. Specifically, at step 204, a designated external force is added to a gravity as shown in FIG. 9. At step 205, a deflection quantity in the a2 axis direction is obtained as shown in FIG. 5. Similarly, at step 206, a deflection quantity in the a2 axis is obtained. At step 207, the deflection quantities in the a1 and a2, axes are added together to obtain the position of an end point of the segment. It is judged at step 208 whether the end point is within the ellipsoid, as shown in FIG. 7. If the end point is within the ellipsoid, a collision avoidance process is executed at step 208. At step 210, shading and coloring the displayed image is determined in accordance with an angle between the light source direction and the surface of the hair. Thereafter, returning back to FIG. 11, at step 108, the hair is cut as shown in FIG. 8. At step 10 9, the obtained hair model 1 is transformed into, for example, three-dimensional line segment data, by using a Z buffer algorithm or the like, and displayed on a screen. At step 110, the head model 1a of polygon data is displayed.

Figure 13:
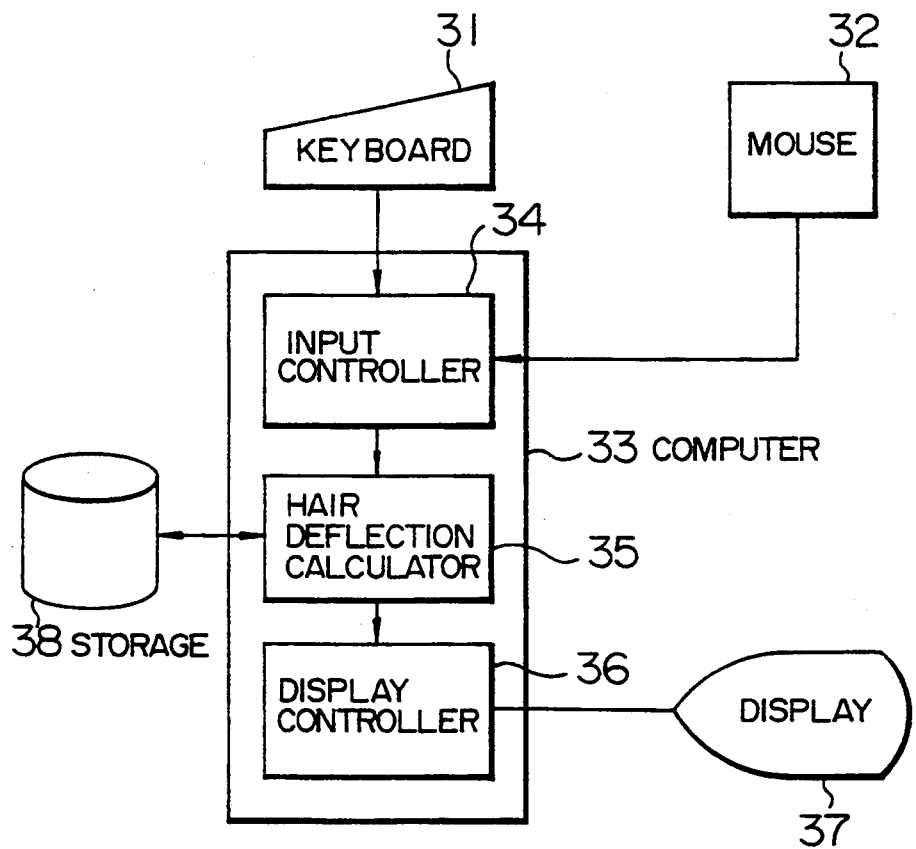
FIG. 13 is a block diagram showing the arrangement of a system embodying the apparatus of the present invention.

FIG. 13 shows the system configuration of an apparatus for performing the hair modeling method according to the present invention. This apparatus is constructed of a keyboard 31, mouse 32, computer 33, graphics display 37 and storage Unit 38. The keyboard 31 and mouse 32 constitute an input unit for entering various parameters such as a flexural rigidity of hair, the magnitude and direction of an external force, and other parameters. The computer 33 has an input controller 34 for controlling inputs from the input unit, a calculating unit 35 for calculating a hair deflection quantity from input data, and a display controller 36 for controlling a display of the hair model 1 and head model 1a on a display 37 in accordance With the calculation The computer 33 is results by the calculating unit. The computer 33 is constructed of hardware including a CPU, graphics processor, memory and the like. The storage unit 38 is a memory such as a hard disk for storing programs performing the processes shown in FIGS. 11 and 12, display data of the head model, and the like.

According to this embodiment, given a flexural rigidity of hair and an external force vector, the shape of a hair can be determined basing upon their physical relationship, so that the number of parameters to be designated by a user becomes small. Even a novice user can easily set a hair style.

Next, the second embodiment of the present invention will be described with reference to FIG. 14. FIG. 14 shows the fundamental flow of a procedure of generating a motion of hair. First, a three-dimensional model of a human head is defined and the hair growing area and hair style are defined (step 141). Next, initial values of various data used for calculating the motion of hair are inputted (step 142). In this embodiment, the mechanics equation (1) is simplified, and solved to obtain a realistic motion of hair. Necessary data for this purpose will be described below.

First, the equation (1) for a single curve will be described for the purpose simplicity. The potential energy term E(r) is assumed to consider only the elastic deformation energy for a spatial curve, particularly, the energy associated with a curvature change. In this case, if the equation of a curve can be represented by:

$$r = r(a, t) = \{x(a, t), y(a, t), z(a, t)\} \quad (4)$$

then the energy is given by:

$$E(r) = \int K(a) \{(d^2x(a, t)/da^2)^2 + (d^2y(a, t)/da^2)^2 + (d^2z(a, t)/da^2)^2\} \, da \quad (5)$$

Integration is performed relative to a parameter a. It is assumed for the purpose of Simplicity that a curve is defined by $0 \leq a \leq 1$. A function K(a) is called hereinafter a curvature energy coefficient. The second-order derivative at the term of a function to be integrated is related to the variable a, and so a partial differential symbol ∂ should by used. However, a letter d is used for convenience purpose. Consider, for example, a gravity g(r) and a wind force w(r, t) are defined by:

$$g(r) = \rho(a)G, \quad w(r, t) = fl(r, t) \quad (6)$$

then the external force term is given by:

$$f(r,t) = g(r) + w(r, t) \quad (7)$$

It is obvious that an external force other than a wind force is also processed by formulating the equation (7). For example, a motion of hairs caused by a body motion may be processed by a user by designating the term w(r, t). Various types of such external forces may be used, by entering actually measured data or using a database.

Figure 15:
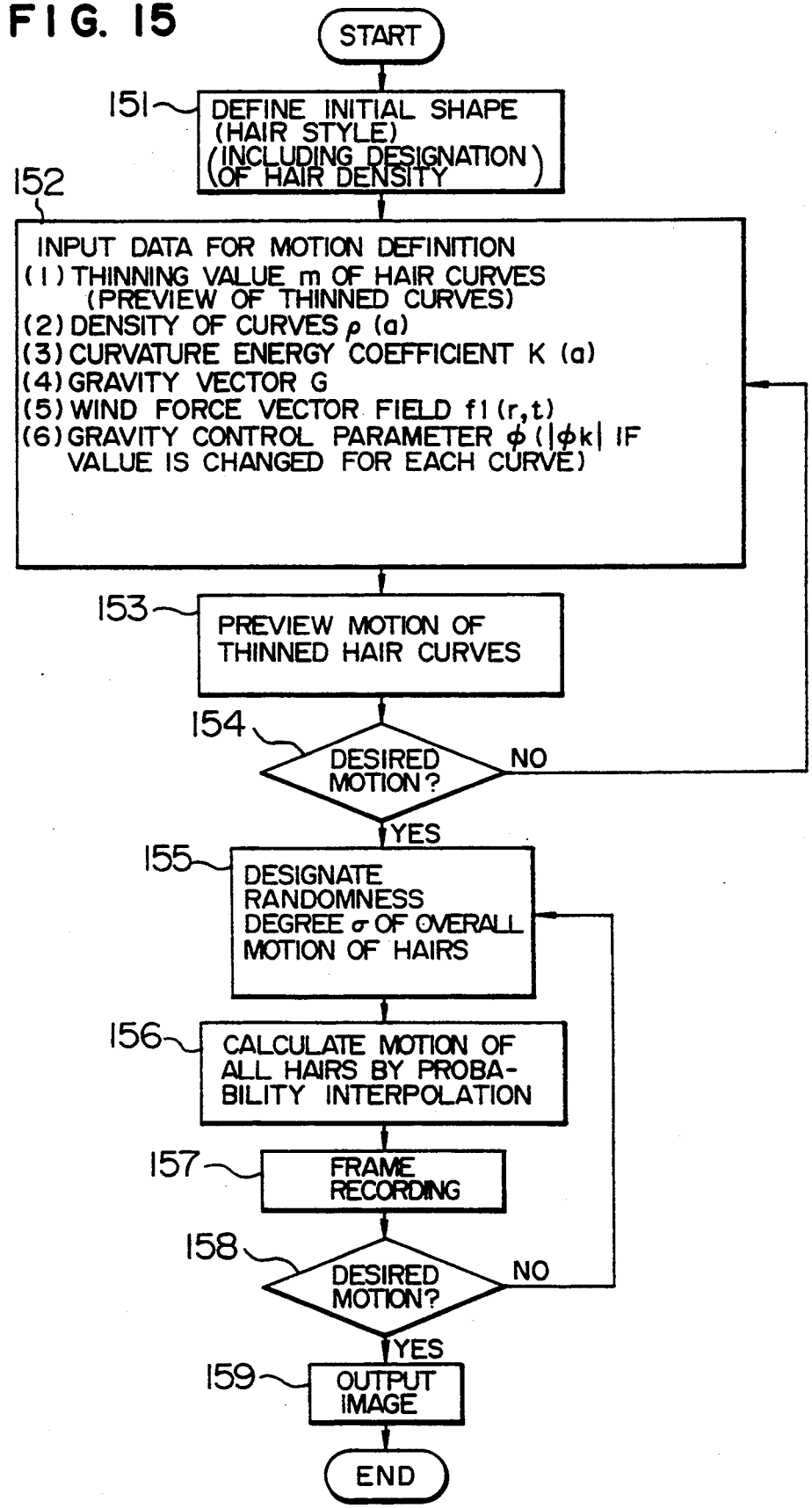
FIG. 15 is a flow chart showing the fundamental procedure of calculating a hair model motion.

Under the above-described conditions, a user inputs as the initial data, at step 152 shown in FIG. 15, the terms (2) to (6), i.e., a density $\rho(a)$ of curves, a curvature energy function K(a), a gravity vector G, a wind force vector field fl (r, t), and a gravity control parameter $\phi$ ($\phi_k$ if a different parameter is set to each curve). Of these inputted data, the curvature energy function K(a) indicates data regarding the physical property and attribute of hair. This data can be intuitively thought that it expresses the rigidity of hair and the like. Actually, the rigidity of each hair may often be considered the same. In such a case, a constant value is given independently of a position (represented by a parameter a). Likewise, the density r(a) of hairs may also be considered actually as taking a constant value independently of the value a. A constant value is also inputted as the gravity vector G irrespective of a position. In this example, as the wind force, a vector field fl (r, t) is inputted. This field is a function of the coordinate values x, y and z of a position and a time t, and it is not easy for a user to designate such values. In view of this, in this embodiment, a library of typical wind force vector fields is prepared to select a desired vector force.

After the hair style (all hair curves) is defined in the manner described above, a hair thinning number m (indicating what percent of all hairs are subject to hair curve calculation) is given. Specifically, all hairs are not subject to calculation at a time, but calculation is executed by thinning a desired number of hairs. In expressing a motion of hair, the equation (1) is solved on the restricted condition that the length of each hair is constant and does not change with time. A numerical computer solution for this may use a well-known Lagrange's method of undetermined multipliers or the like. Even if the number n of hairs is several hundreds at the most, the equation (1) having unknown functions $r_1, r_2, \ldots, r_n$ as the external force function fl, is very difficult to solve. As an auxiliary means for solving the equation (1) for several hundreds hairs, the external force term of the equation (1) is defined for each hair curve so that it does not depend on other hair curves. For example, strictly speaking although it should be taken into consideration friction, repulsion, and other forces of hairs as external forces, a user defines the following virtual force as the external force:

$$f(r, t) = \phi g(r) + w(r, t) \quad (8)$$

where $\phi$ is an optional real constant a user inputs. For example, if a value larger than 1 is set to $\phi$, the magnitude of a gravity becomes larger than an actual magnitude, so that a motion of hairs become heavier, reproducing the state that hairs have large friction forces and are difficult to move.

Assuming that the equation (8) is a definition of the external force term for a k-th curve $r_k$, it can be expressed more precisely by:

$$f(r, t) = \phi_k g(r) + w(r, t) \quad (9)$$

Namely, the value of the coefficient $\phi$ of the equation (8) is replaced by $\phi_k$ of the equation (9) taking a different value for each curve. For example, if wind blows against the front surface of a face, the freedom of degree of the motion of hairs growing on the front of the head is great, and so the value of $\phi_k$ is set to 1. For hairs near the neck, the value $\phi_k$ is set to a value larger than 1 because of the effect of weight of hairs above the neck. The value realizing a realistic motion is determined in the following manner. Several hundreds or less hairs are subject to motion simulations, and animation images are checked by a preview system (step 143 of FIG. 14). The above operation is repeated on the trial and error basis until a desired motion is obtained (step 144 in FIG. 14). As described above, the equation (1) for each hair curve $r_k$ is defined so that it does not contain terms for hair curves other than the hair curve $r_k$. As a result, all necessary curves can be calculated independently in parallel, and moreover can be processed at a high speed by reducing the number of hairs and using a preview method. Although a trial and error scheme is essential, this method can considerably reduce the substantial, necessary process time, thereby providing a fairly practical solution to forming a desired animation. The above-description has been directed to how to deal with the external force term. In the similar manner, a user can properly define the term E(r) to obtain the effects of material such as the rigidity of hair.

Next, all hair curvest are displayed in accordance with the results of the above-described preview. A motion of curves of thinned hairs obtained from the preview, is propagated somewhat in a random manner, to a motion of curves of nearby hairs. Namely, a probability interpolation is carried out which will be later described. The degree $\sigma$ of randomness is inputted as a numerical value (step 145 in FIG. 14), to thereafter calculate motions of all hairs (step 146 in FIG. 14). After recording one frame after another (step 147 in FIG. 14), a fine animation like the final animation is produced. Man-machine interactively inputting the value is repeated until a desired result is obtained (step 148 in FIG. 14), and a final image is formed (step 149 in FIG. 14). In the following description, a curve used for obtaining a preview result is called a preview curve for the convenience sake.

Figure 16:
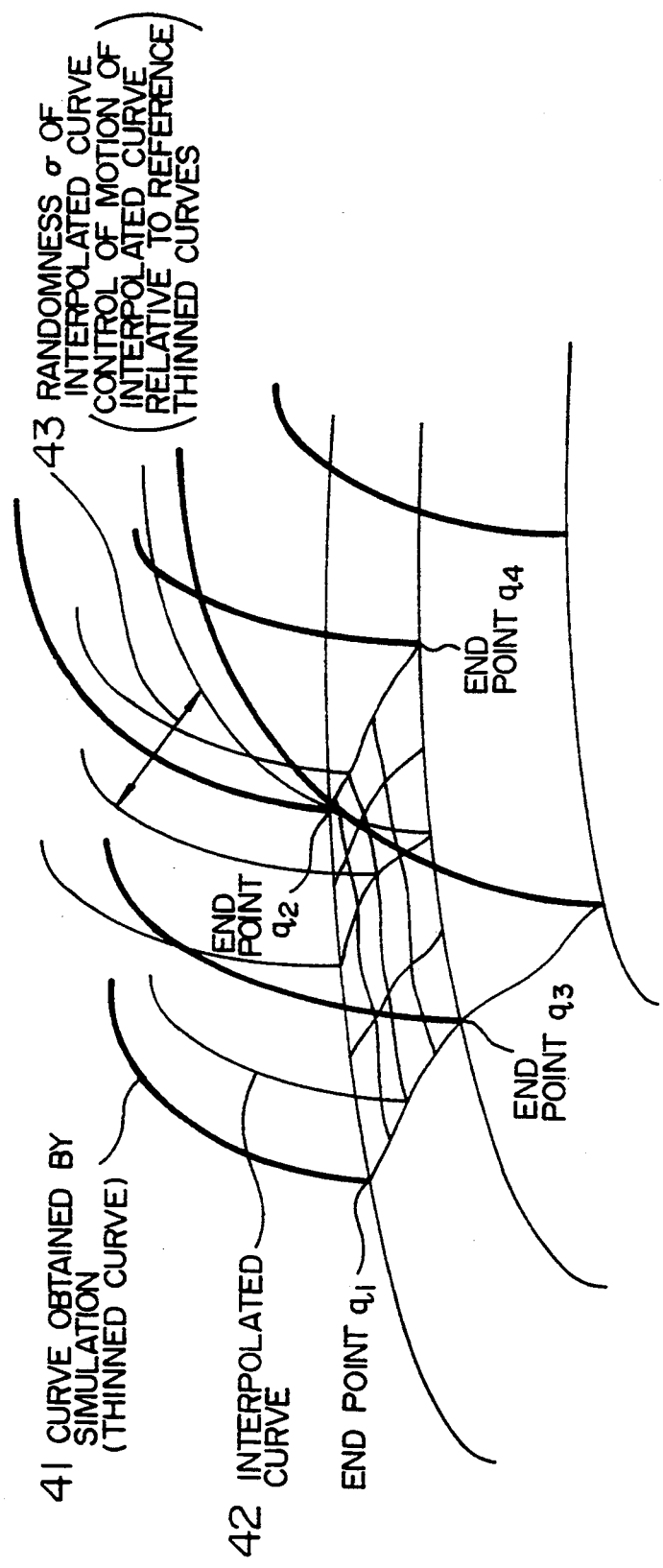
FIG. 16 is a diagram illustrating how an interpolated curve is obtained.
Figure 17:
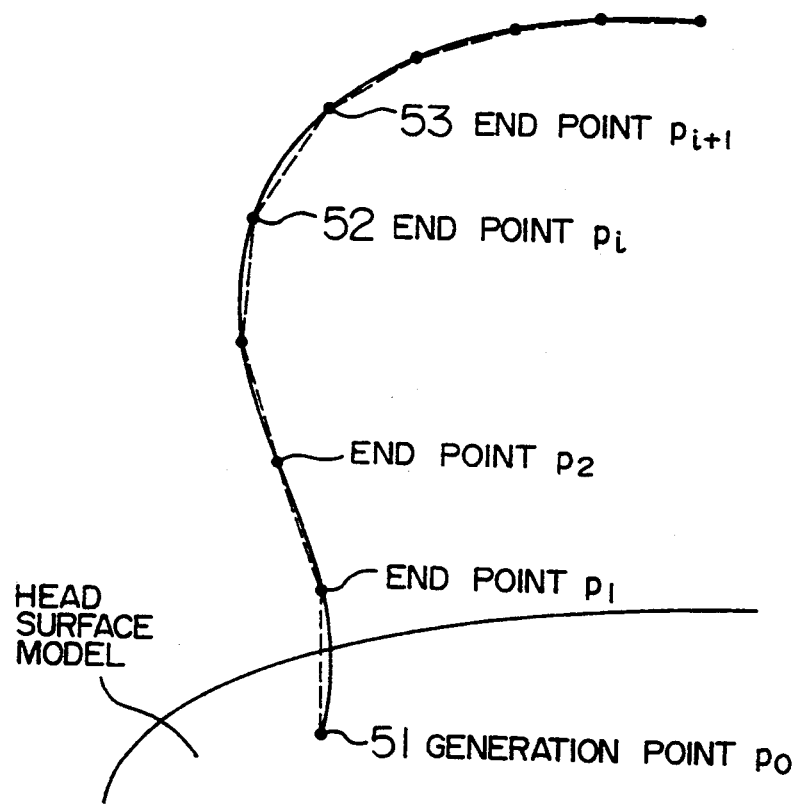
FIG. 17 is a diagram Showing how a hair curve is approximated by broken lines.

Next, a probability interpolation of preview curves will be described with reference to FIG. 15 providing the details of FIG. 14. Each curve is shown as a succession of short line segment (indicated by broken lines in FIG. 17) in order to solve the equation (1) and also to display the hair curve. As shown at steps 151 and 152 of FIG. 15, the number of interpolation curves formed between preview curves is determined from a predetermined density of hairs (total hairs) and the thinning degree (designated by one hair per m hairs). In FIG. 16 with the value m being set to 5, there are twenty one generation points of interpolation curves (indicated by reference numeral 42 in FIG. 16) on and within a square defined by four corners $q_1$, $q_2$, $q_3$ and $q_4$ which are generation points of four preview curves (indicated by reference numeral 41 in FIG. 16). Since the initial shape of each interpolation curve is determined when defining the hair style, obtained in the following description is the position of each interpolation curve moved as the external force and attribute change. As shown in FIG. 17, representing an interpolation curve as a sequence of line segments $P_0P_1$, $P_1P_2$, ..., $P_{n-1}P_n$, a series of standard positions $P_0'$, $P_1'$, ..., $P_n'$ of the end points at the next time step is determined in the following manner. Since the generation point is fixed, $P_0' = P_0$. With a given $P_1'$, the position on the next end point $P_{i+1}'$ is definitely determined by setting the direction of $P_i'P_{i+1}'$ in parallel with $\Sigma_k d(q_0 k, P_0) q_i q_{i+1}$ because the length of the line segment $P_i'P_{i+1}'$ is the same as that of the line segment $P_iP_{i+1}$. A d(p, q) represents a distance between two points p and g The distance may use an ordinary Euclidian distance or Manhattan distance. Next, a series of actual positions $r_0'$, $r_1'$, ..., $r_n'$ is determined from the standard positions and the randomness degree $\sigma$ (step 155 in FIG. 15). This randomness degree $\sigma$ (indicated by reference numeral 43 in FIG. 16) is a quantity defining how far the actual position goes from the standard position, and is a function $\sigma = \sigma(i)$ which takes the smaller value as the end point number i comes nearer the generation point. At the distal end of a curve, i.e., at the maximum i, the randomness degree takes usually a large value. Since the generation point is fixed, $r_0 = r_0$. With a given $r_i$, the next actual end point $r_{i+1}'$ is defined (by using a random number) as an optional one point on a circular plane having a radius $\sigma(i)$ and a center $P_i'$ perpendicular to the line segment $P_i'P_{i+1}'$. In the above manner, the positions of all hairs can be calculated (step 156 of FIG. 15). The processes (steps 157, 158 and 159 of FIG. 15) after the frame recording step have been described already.

A description will be made for another example of formulation using a simpler method different from the above-described embodiment. Similar to the above embodiment, each hair is represented by a set of broken lines as shown in FIG. 17. A change in position of a hair with time with an external force being applied can be calculated using the following procedure. It is now assumed that the positions of a hair at time t=0 have been inputted already. The positions at time $t = (n+1)\Delta\pi$ can be functionally obtained from the position information at time $t = n\Delta\pi$ by the following procedure (where $\Delta\pi$ is a time interval). In the following description of this procedure, time is simply described in terms of n.

Figure 18:
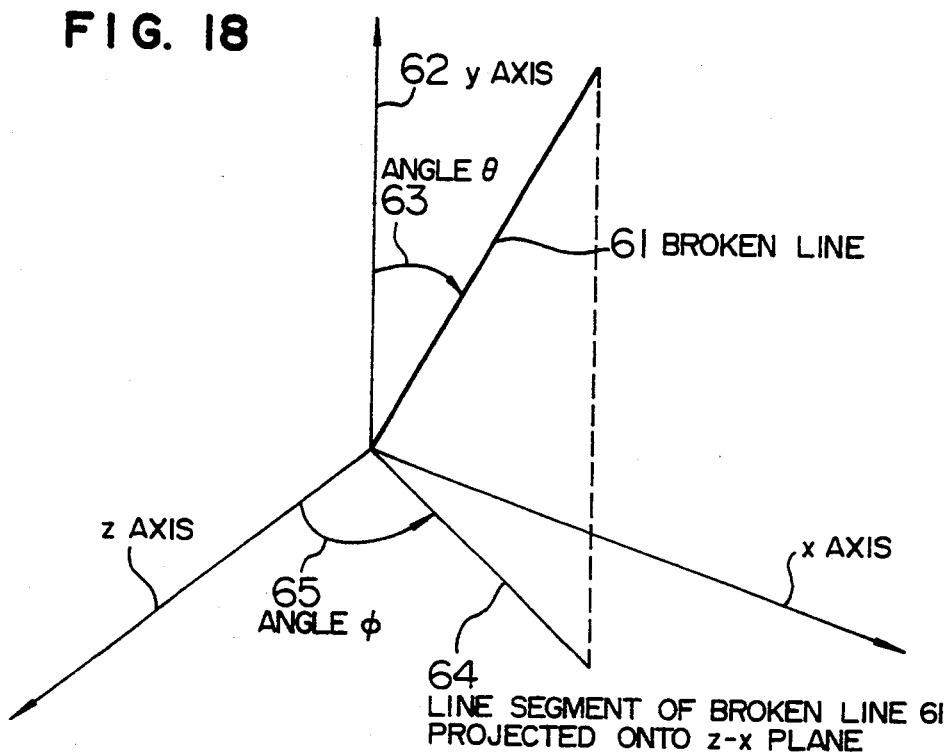
FIG. 18 is a diagram illustrating a spherical coordinate system.

(1) Angles $\theta = \theta_k$ and $\phi = \phi_k$ are obtained for the k-th broken line counted from the proximal end (indicated by reference numeral 61 in FIG. 18) within the coordinate system of FIG. 18, where k=1 to m (m is the number of broken lines per one hair). The angle $\theta$ is an angle between the positive direction of the y axis (indicated by reference numeral 62 in FIG. 18) and the broken line, and the angle $\phi$ is an angle between the positive direction of the z axis and the line segment (indicated by reference numeral 64 in FIG. 18) of the broken line projected onto the z-x plane. The angles are represented by $\theta_k(n)$ and $\phi_k(n)$ as a function of time n.

(2) Next, the following equations are solved to obtain $\theta$ and $\phi$ at time n+1 by using $\theta$ and $\phi$ at times n−1 and n:

$$\theta_k(n+1) - \theta_k(n) + \theta_k(n-1) = (\Delta\tau)^2 c_k F\theta \quad (10)$$

$$\phi_k(n+1) - 2\phi_k(n) + \phi_k(n-1) = (\Delta\tau)^2 d_k F\phi \quad (11)$$

Figure 19:
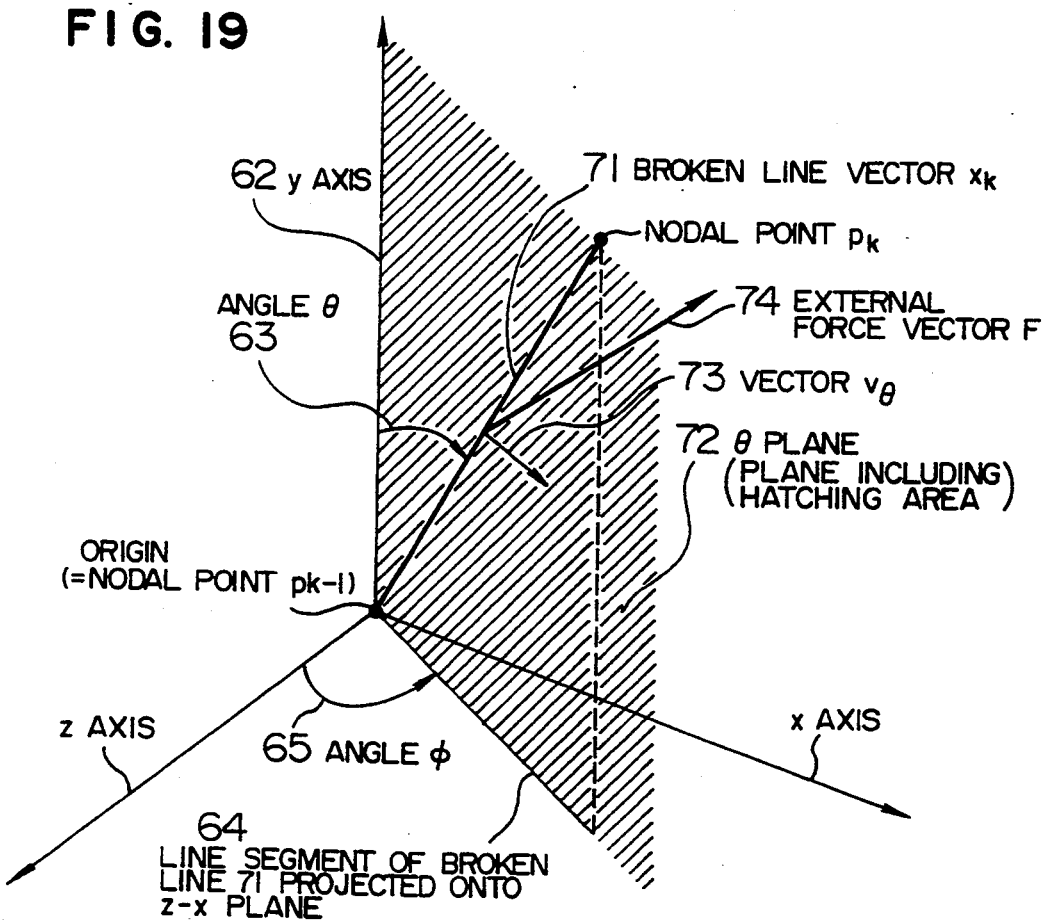
FIG. 19 is a diagram showing projection onto a plane under an external force field.
Figure 20:
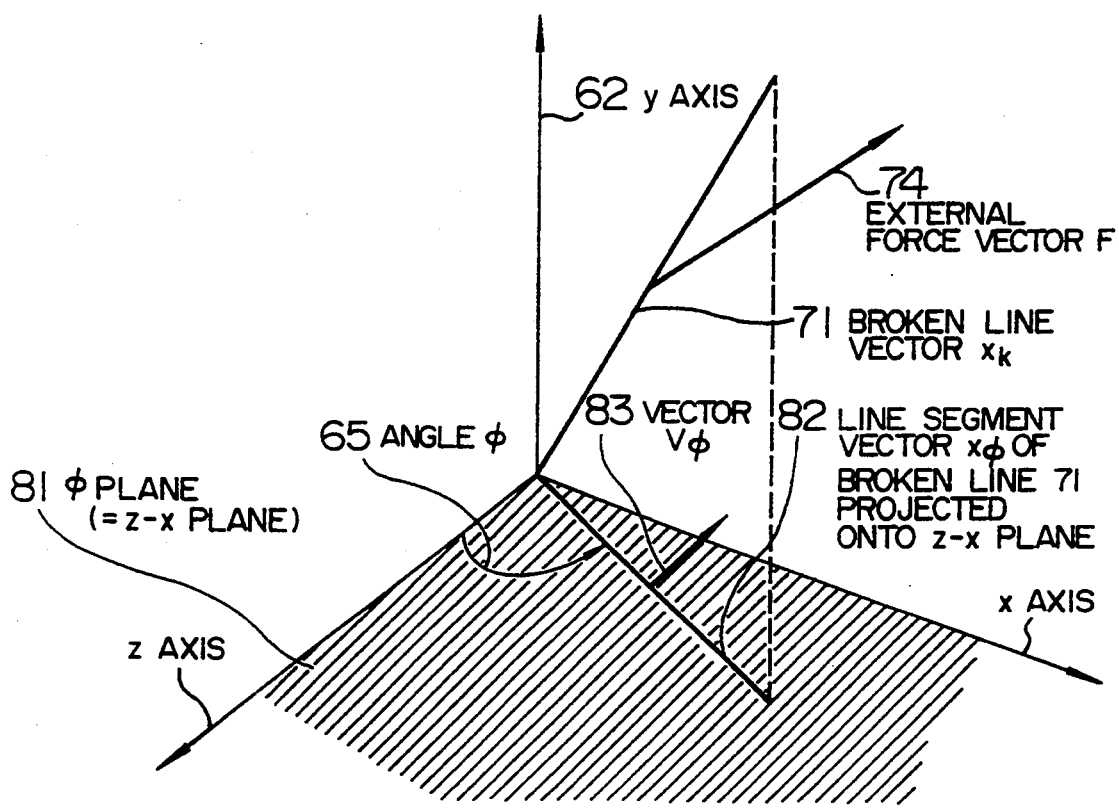
FIG. 20 is a diagram showing projection onto a z-x plane under an external force field.

$F\theta$ and $F\phi$ are scalar fields obtained by projecting an external force field F(t, x) onto a $\theta$ plane and $\phi$ plane shown in FIGS. 19 and 20, the external force field being a function of time t and the position x of a node point $P_k$ of a hair. $c_k$ and $d_k$ correspond to so-called moment-of-inertia terms. For the simplicity purpose, in this embodiment, $c_k$ and $d_k$ are defined by the following equation:

$$c_k = d_k = I_0/k \quad (12)$$

A user inputs a constant $I_0$ which is proportional to a value determined by the mass and length of one hair.

Dividing the constant Io by k in the equation (12) means that the more the position of a hair goes apart from its root, the more it swings.

Referring to FIGS. 19 and 20, how $F\theta$ and $F\phi$ are obtained from the inputted (selected) external force field F will be described.

FIG. 19 illustrates the $\theta$ plane and $F\phi$. The $\phi$ plane is a plane passing through the y axis (indicated by reference numeral 62 in FIG. 19) and a vector $x_k$ (indicated by reference numeral 71 in FIG. 19) obtained by parallel-displacing the line segment $P_{k-1}P_k$ to the origin. $F\theta$ is an inner product of a vector $v\phi$ (indicated by reference numeral 73 in FIG. 19) and the external force F (indicated by reference numeral 74 in FIG. 19). The vector $v\theta$ has a magnitude of "1" and a direction (counter clockwise direction in FIG. 19) on increasing the angle 8 perpendicular to the vector $x_k$.

FIG. 20 illustrates the $\theta$ plane and $F\phi$. The $\theta$ plane is a z-x plane (indicated by reference numeral 81 in FIG. 20). $F\phi$ is an inner product of a vector $V\phi$ (indicated by reference numeral 83 in FIG. 20) and the external force F. The vector $V\phi$ has a magnitude of "1" and a counter clockwise direction in the $\phi$ plane perpendicular to a vector $x\phi$ (indicated by reference numeral 82 in FIG. 20) obtained by projecting the vector $x_k$ onto the $\phi$ plane.

In order to add the property of flexibility or the like of a hair, a reaction force term $R\theta$ ($R\phi$) is entered in the $F\theta$ ($F\phi$) term for example, $R\theta$ may be expressed by a function of a difference between the angle $\theta_{k-1}(n)$ of the line segment $P_{k-2}P_{k-1}$ one segment before the segment $P_{k-1}P_k$ and the angle $\theta_k(n)$, namely:

$$R\theta = f\{\theta_k(n) - \theta_{k-1}(n)\} \qquad (13)$$

where f is a function which takes a constant value when the absolute value of the difference $\theta_k(n) - \theta_{k-1}(n)$ is larger than a threshold value, and takes "0" when the absolute value is sufficiently near "0". With this arrangement, a reaction force for weakening the external force can be controlled for the case that a line segment bends too much.

The fundamental description of the calculation procedure has been given in the process (2). There is one exceptional process when the angle $\phi$ becomes "0". In such a case, the y axis and the line segment extend in the same direction so that the $\theta$ plane cannot be defined. In this case, used as the $\theta$ plane is a plane passing through the y axis and the external force field vector F. (3) After obtaining values at time n+1 in the manner described in the process (2), interference between each line segment and the head is checked so as to avoid a line segment entering the head (of hair is long and there is a possibility that hair touches the body, interference between hair and body is also checked. In the following description, only interference between hair and head is checked for the simplicity of description. Checking interference between hair and body and following processing are the same as the case of hair and head). If a line segment obtained in the manner described in the process (2) collides with the head or enters the head, the position of the line segment is corrected. (4) The above processes (1), (2) and (3) are repeated for all hairs to obtain the positions of all hairs at time n+1.

The above method does not consider a judgment of crossing between hairs and the like, similar to the first embodiment.

As appreciated from the equations (10) to (12), for a given fixed hair, the position information of not only at time t+1 but also up to a designated time m (m>n) can be sequentially calculated from the position information at time n−1 and time n, allowing high speed calculation.

Figure 21:
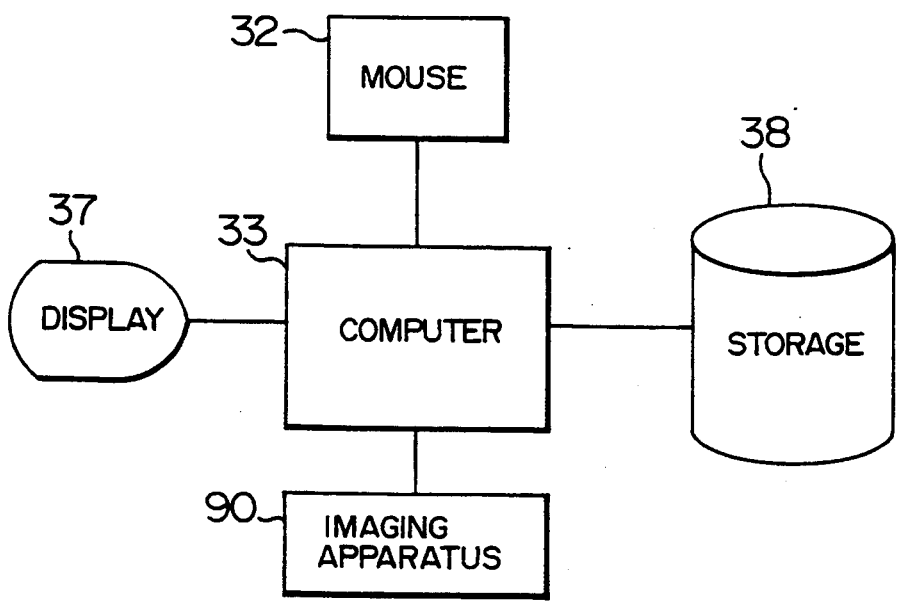
FIG. 21 shows a computer graphics system arrangement used by the second embodiment of the present invention.

An example of the arrangement of a system realizing the above-described embodiments is shown in FIG. 21. This system arrangement is basically the same as that of the first embodiment shown in FIG. 13. The characteristic feature of this s stem arrangement resides in a provision of a frame recording apparatus 90 for providing an animation preview and a final animation. In this embodiment, a computer 33 performs the procedure starting from solving mechanics equations to generating graphics data. Moreover, if parameters of this embodiment which are difficult for a user to designate, including the curvature energy coefficient K(a), wind force vector field fl(r, t), randomness degree $\sigma$ and the like, are provided in the form of libraries and stored in a database, animations can be generated efficiently.

According to this embodiment, a motion of human hairs and animal feathers changing with an external force and material can be expressed realistically and easily as computer graphics images. Namely, without depending upon strict physical simulation, both man-machine interactive processing and high speed algorithms are used to allow efficient and realistic animations of hairs and feathers.

What is claimed is:

1. A method of displaying a style of hairs deformed by an external force and a base body from which hairs extend, on a display screen, comprising the steps of:
   a) defining a hair as composed of a plurality of rod-shaped hair elements;
   b) giving a magnitude and direction of an external force applied to each of said rod-shaped hair elements;
   c) obtaining a deformation quantity of each of said rod-shaped hair elements such that an internal force of each of said rod-shape hair elements generated by a predetermined rigidity of each of said rod-shaped hair elements is equilibrated with said external force having said magnitude and direction; and
   d) determining a shape of each of said rod-shaped hair elements in accordance with said deformation quantity and displaying the shape of each of said rod-shaped hair elements and said base body on said display screen.

2. A method according to claim 1, wherein said steps a) and b) define a hair generation point of a respective one of said rod-shaped hair elements as a pore, determine said hair generation point as a fixed point, and give said magnitude and direction of said external force applied to each of said rod-shaped hair elements at an area other than said fixed point.

3. A method according to claim 2, wherein an ellipsoid approximating the shape of said body is determined, said hair generation point of each said rod-shaped hair elements is identified on a coordinate system representing a surface of said ellipsoid, each of said rod-shaped hair elements and said hair generation point of said rod-shaped hair elements are determined by using coordinate values on said ellipsoid surface.

4. A method according to claim 3, further including judging whether each of said rod-shaped hair elements is the shape of which was determined such that an external force of each of said rod-shaped hair elements is equilibrated with said external force, entered said ellipsoid, and when each of said rod-shaped hair elements is entered said ellipsoid, the shape of each of said rod-shaped hair elements is changed so as not to enter said ellipsoid.

5. A method according to claim 3, wherein said hair generation point of each of said rod-shaped hair elements is deleted and each of said rod-shaped hair elements extending from said hair generation point is cut, respectively, at a position predetermined by coordinate values or by a length, or part of each of said rod-shaped hair elements extending from said position is not displayed.

6. A method according to claim 3, wherein said hair generation point of each of said rod-shaped hair elements and each of said rod-shaped hair elements extending from said hair generation point are changed by designating an optional magnitude and optional direction of said external force applied to each of said rod-shaped hair elements.

7. A method according to claim 1, wherein said step a) defines a set of linear rod-shaped segments as each of said rod-shaped hair elements, and couples a plurality of said linear rod-shaped segments.

8. A method according to claim 7, wherein a hair generation point of a respective one of said rod-shaped segments is defined as a pore, said hair generation point is determined as a fixed point, and said magnitude and direction of said external force applied to end points of each of said rod-shaped segments extending from said fixed point are determined.

9. A method of displaying a style of hairs deformed by an external force and a base body from which hairs extend, on a display screen, comprising the steps of:
   a) defining a hair as composed of a plurality of rod-shaped hair elements;
   b) giving a magnitude and direction of an external force applied to each of said rod-shaped hair elements, and a rigidity of each of said rod-shaped hair elements;
   c) obtaining a deformation quantity of each of said rod-shaped hair elements basing upon said magnitude, direction and rigidity; and
   d) determining a shape of each of said of said rod-shaped hair elements in accordance with said deformation quantity and displaying the shape of each of said rod-shaped hair elements and said base body on said display screen.

10. A method of displaying a style of hairs deformed by an external force and a base body from which hairs extend, on a display screen, comprising the steps of:
   a) defining each of a plurality of hairs as an elastic body;
   b) determining an initial shape of each said elastic body;
   c) giving an external force applied to each said elastic body and an attribute of each said elastic body;
   d) calculating a mechanics equation representing a deformation of each said elastic body basing upon said external force and attribute to obtain a position of each said elastic body changed from said initial shape;
   e) obtaining elastic body curves of specific elastic bodies among a plurality of said elastic bodies, in accordance with said changed position;
   f) interpolating deformation quantities of said elastic body curves of said specific elastic bodies to generate deformation quantities of other said elastic bodies; and
   g) displaying a shape of each said elastic body and said base body on said display screen.

11. A method according to claim 10, wherein said external force to be designated at said step c) and applied to each said elastic body is related only to each said elastic body and is not influenced by external forces applied to other said elastic bodies.

12. A method according to claim 10, wherein said external force to be designated for each said elastic body is related only to each said elastic body, and virtual external forces are designated for other said elastic bodies.

13. A method according to claim 10, wherein interpolation of said elastic body curves at said step f) is performed for randomly designated said elastic body curves.

14. A method according to claim 10, wherein said external force designated at said step c) and applied to each said elastic body includes an optional gravity vector.

15. A method according to claim 10, wherein said external force designated at said step c) and applied to each said elastic body includes an external force generated by a motion of said base body.

16. A method according to claim 10, wherein said attribute of each said elastic by designated at said step c) includes an elastic deformation energy of each said elastic body, and a magnitude of density of said elastic deformation energy is designated independently from actually measured values of elastic deformation energies of hairs.

17. An apparatus for displaying a style of hairs deformed by an external force and a base body from which hairs extend, on a display screen, comprising:
   a display;
   input means for entering a magnitude and direction of an external force applied to each hair element, and a predetermined flexural rigidity value of each said hair element, each hair being defined as composed of a plurality of rod-shaped said hair elements;
   calculating means for obtaining a deformation quantity of each said hair element basing upon said magnitude, direction and flexure rigidity value; and
   display controlling means for determining a shape of each said hair element in accordance with said deformation quantity and displaying the shape of each said hair element and said base body on said display screen.

18. An apparatus for displaying a style of hairs deformed by an external force and a base body from which hairs extend, on a display screen, comprising:
   input means for entering an initial shape of an elastic body, each of a plurality of hairs being defined as said elastic body, and inputting an external force applied to each said elastic body including at least a gravity and a wind force and an attribute of each said elastic body including at least the material of each said elastic body;
   calculating means for solving a mechanics equation representing a deformation of each said elastic body basing upon said external force and attribute to obtain a position of each said elastic body time sequentially changed from said initial shape, and obtaining elastic body curves of specific elastic bodies among a plurality of said elastic bodies, in accordance with said changed position;

interpolating means for interpolating deformation quantities of said elastic body curves of said specific elastic bodies to generate deformation quantities of other said elastic bodies; and a display means for displaying a shape of each said elastic body and said base body.

19. An apparatus according to claim 18, wherein said external force and attribute are interactively entered by said input means.

20. An apparatus according to claim 18, further comprising recording means for continuously recording the time sequential motion of said elastic bodies after interpolation by said interpolating means.

* * * * *